United States Patent
Cousins et al.

(10) Patent No.: US 12,035,094 B2
(45) Date of Patent: Jul. 9, 2024

(54) EAR TIP FOR PORTABLE WIRELESS LISTENING DEVICE

(71) Applicant: APPLE INC., Cupertino, CA (US)

(72) Inventors: Benjamin A. Cousins, San Jose, CA (US); Robert Chun, San Diego, CA (US); Priyanka Venkatesh, San Francisco, CA (US); Thanh P. Hua, San Jose, CA (US); Jarrett Lagler, San Francisco, CA (US); Hanchi Chen, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 151 days.

(21) Appl. No.: 17/895,025

(22) Filed: Aug. 24, 2022

(65) Prior Publication Data
US 2023/0269509 A1    Aug. 24, 2023

Related U.S. Application Data

(60) Provisional application No. 63/268,356, filed on Feb. 22, 2022.

(51) Int. Cl.
*H04R 1/10*  (2006.01)
*G06F 3/041*  (2006.01)
(Continued)

(52) U.S. Cl.
CPC ....... *H04R 1/1016* (2013.01); *G06F 3/04144* (2019.05); *G06F 3/044* (2013.01);
(Continued)

(58) Field of Classification Search
CPC .................... H04R 1/10; H04R 1/1016; H04R 2225/0216; H04R 2225/025; H04R 25/652; H04R 25/656
See application file for complete search history.

(56) References Cited

U.S. PATENT DOCUMENTS

| | | | |
|---|---|---|---|
| 3,080,011 A * | 3/1963 | Henderson | H04R 25/656 |
| | | | 128/868 |
| 4,981,194 A * | 1/1991 | Kamon | H04R 1/1016 |
| | | | 181/158 |

(Continued)

FOREIGN PATENT DOCUMENTS

| | | | | |
|---|---|---|---|---|
| CN | 113810809 A | | 12/2021 | |
| GB | 2537353 A | * | 10/2016 | ........... H04R 1/1016 |

OTHER PUBLICATIONS

Partial European Search Report issued in European Application No. EP23157342.9, dated Oct. 16, 2023 in 6 pages.

(Continued)

*Primary Examiner* — Ryan Robinson
(74) *Attorney, Agent, or Firm* — Kilpatrick Townsend & Stockton LLP

(57) ABSTRACT

A deformable ear tip comprising: an annular inner ear tip body having a sidewall extending between first and second opposing ends thereby defining a sound channel through the ear tip; an annular outer flange integrally formed with and surrounding the first end of the inner ear tip body and extending towards the inner ear tip second end forming an air gap between the annular inner ear tip body and the annular outer flange along a portion of a length of the ear tip, wherein the outer flange comprises a first material having a first durometer and is sized and shaped to be inserted into a human ear canal; and an inner flange integrally formed with the inner ear tip body and comprising a second material having a second durometer less than the first durometer, the inner flange body extending from a location along the inner ear tip body between the first and second ends towards an inner surface of the outer flange body.

20 Claims, 18 Drawing Sheets

(51) Int. Cl.
*G06F 3/044* (2006.01)
*H02J 7/00* (2006.01)
*H04R 1/02* (2006.01)

(52) U.S. Cl.
CPC ............ *H02J 7/0044* (2013.01); *H04R 1/023* (2013.01); *H04R 1/1025* (2013.01); *H04R 1/1041* (2013.01); *H04R 1/1058* (2013.01); *H04R 1/1075* (2013.01); *H04R 2420/07* (2013.01); *H04R 2460/11* (2013.01)

(56) References Cited

U.S. PATENT DOCUMENTS

| | | | | |
|---|---|---|---|---|
| 6,148,821 | A * | 11/2000 | Falco | H04R 1/1016 128/867 |
| 6,931,142 | B2 * | 8/2005 | Fushimi | H04R 1/1016 381/325 |
| 7,311,526 | B2 | 12/2007 | Rohrbach et al. | |
| 7,436,974 | B2 | 10/2008 | Harper | |
| 7,658,613 | B1 | 2/2010 | Griffin et al. | |
| 8,201,561 | B2 * | 6/2012 | Blanchard | A61F 11/08 181/134 |
| 8,270,656 | B2 | 9/2012 | Stiehl et al. | |
| 8,280,093 | B2 * | 10/2012 | Siahaan | H04R 1/1016 381/382 |
| 9,167,329 | B2 | 10/2015 | Honeycutt | |
| 9,167,336 | B2 | 10/2015 | Siahaan et al. | |
| 9,571,912 | B2 | 2/2017 | Siahaan et al. | |
| 10,097,913 | B2 | 10/2018 | Zörkendörfer et al. | |
| 10,129,625 | B2 * | 11/2018 | Huwe | H04R 1/1058 |
| 10,206,474 | B2 | 2/2019 | Brzezinski et al. | |
| 10,237,640 | B2 | 3/2019 | Siahaan et al. | |
| 10,542,341 | B2 * | 1/2020 | Higgins | H04R 25/60 |
| 10,785,553 | B2 | 9/2020 | Sang et al. | |
| 10,986,433 | B2 | 4/2021 | McIntosh et al. | |
| 10,999,670 | B2 * | 5/2021 | Zalisk | H04R 1/1016 |
| 11,012,770 | B2 | 5/2021 | Hatfield et al. | |
| 11,102,563 | B2 | 8/2021 | Stanley et al. | |
| 11,159,869 | B2 | 10/2021 | Grinker et al. | |
| 11,206,472 | B2 | 12/2021 | Cousins et al. | |
| 11,206,473 | B2 | 12/2021 | Ji et al. | |
| 11,582,549 | B2 * | 2/2023 | Zalisk | H04R 25/652 |
| 2003/0081794 | A1 * | 5/2003 | Fushimi | H04R 1/1016 381/74 |
| 2010/0166241 | A1 * | 7/2010 | Sabio | H04R 25/656 381/328 |
| 2010/0225430 | A1 | 9/2010 | Fullerton et al. | |
| 2016/0057528 | A1 * | 2/2016 | Trine | H04R 25/654 381/380 |
| 2016/0066110 | A1 * | 3/2016 | Shennib | H04R 25/652 381/328 |
| 2019/0098390 | A1 | 3/2019 | Carino et al. | |
| 2020/0100013 | A1 | 3/2020 | Harjee et al. | |
| 2020/0107099 | A1 | 4/2020 | McIntosh et al. | |
| 2020/0107100 | A1 | 4/2020 | Stanley et al. | |
| 2020/0107101 | A1 | 4/2020 | Grinker et al. | |
| 2020/0107102 | A1 | 4/2020 | Sang et al. | |
| 2020/0107109 | A1 | 4/2020 | Cousins et al. | |
| 2020/0107110 | A1 | 4/2020 | Ji et al. | |
| 2020/0314519 | A1 * | 10/2020 | Hatfield | H04R 1/1016 |
| 2021/0195351 | A1 * | 6/2021 | Gunde | H04R 25/656 |
| 2021/0211796 | A1 | 7/2021 | McIntosh et al. | |
| 2021/0243514 | A1 | 8/2021 | Hatfield et al. | |
| 2023/0328421 | A1 * | 10/2023 | Kwak | H04R 1/1058 381/380 |
| 2023/0362562 | A1 * | 11/2023 | Johansen | H04R 25/604 |

OTHER PUBLICATIONS

Extended European Search Report issued in European Application No. EP23157342.9, dated Feb. 21, 2024 in 4 pages.

* cited by examiner

EAR TIP FOR PORTABLE WIRELESS LISTENING DEVICE

This application claims priority to U.S. Provisional Patent Application No. 63/268,356 filed on Feb. 22, 2022, which is incorporated herein by reference in its entirety for all purposes.

BACKGROUND

Portable listening devices, such as headphones, can be used with a wide variety of electronic devices such as portable media players, smart phones, tablet computers, laptop computers, stereo systems, and other types of devices. Portable listening devices have historically included one or more small speakers configured to be place on, in, or near a user's ear, structural components that hold the speakers in place, and a cable that electrically connects the portable listening device to an audio source. Wireless portable listening devices that do not include a cable and instead, wirelessly receive a stream of audio data from a wireless audio source, have become ubiquitous over the last several years. Such wireless portable listening devices can include, for instance, wireless earbud devices or wireless in-ear hearing devices that operate in pairs (one for each ear) or individually for outputting sound to, and receiving sound from, the user.

While wireless portable listening devices have many advantages over wired portable listening devices and have become a very popular with consumers, improved wireless portable listening devices are desirable.

BRIEF SUMMARY

The present disclosure describes various embodiments of portable listening devices that can enable a user to experience high-end acoustic performance and a pleasant, positive user experience as well as various embodiments of deformable ear tips that can improve the listening experience. Other embodiments pertain to a case for charging and storing one or more portable wireless listening devices. Still other embodiments pertain to a system that includes both a pair of portable wireless listening devices and a charging case for the devices.

According to some embodiments, an earphone is provided. The earphone can include: a device housing that defines an interior cavity within the device housing; an acoustic port formed through a wall of the device housing; an audio driver disposed within the device housing and aligned to emit sound through the acoustic port; a user input region disposed along an exterior surface of the device housing; a flex circuit disposed within the interior cavity, the flex circuit including a first portion bonded at a first location to an inner surface of the device housing directly beneath the user-input region, a second portion bonded at a second location to an inner surface of the device housing spaced apart from the first location, and a third portion extending between the first and second portions; a force pixel disposed within the interior cavity and mounted to the first portion of the flex circuit below the user input region; a plurality of touch pixels disposed within the interior cavity between the force pixel and the user input region; sensor control circuitry disposed within the interior cavity and mounted to the second portion of the flex circuit; and a wireless antenna disposed within the interior cavity defined by the device housing.

In some embodiments an earphone can include: a device housing including a speaker housing and a stem extending away from the speaker housing portion, wherein the speaker housing and stem combine to define an interior cavity within the device housing; an acoustic port formed through a wall of the speaker housing; an audio driver disposed within the speaker housing and aligned to emit sound through the acoustic port; a user input region disposed along an exterior surface of the stem; a flex circuit disposed within the interior cavity, the flex circuit including a first portion bonded at a first location to an inner surface of the stem directly beneath the user-input region, a second portion bonded at a second location to an inner surface of the stem spaced apart from the first location, and a third portion extending between the first and second portions; a force pixel disposed within the interior cavity and mounted to the first portion of the flex circuit below the user input region; a plurality of touch pixels disposed within the interior cavity between the force pixel and the user input region; sensor control circuitry disposed within the interior cavity and mounted to the second portion of the flex circuit; and an antenna disposed within the interior cavity along a length of the stem.

In various implementations, the earphone can include one or more of the following features. The touch pixels can be formed within the first portion of the flex circuit. The force pixel can include a first capacitive plate mounted to the flex circuit and a second capacitive plate mounted to the antenna in a spaced apart relationship with the first capacitor plate. The force pixel further can include a foam layer coupled between the first and second capacitor plates. The plurality of touch pixels can be spaced apart from each other along a length of the stem within the user input region. The flex circuit can be laminated to the inner surface of the housing at the first and second locations using a b-stage system in which a first low temperature cure step partially cures the adhesive material and is followed by a UV cure step to fully cure the adhesive and bond the laminate to the wall. The sensor control circuitry can be operatively coupled to excite and capture signals from both the touch pixels and the force pixel. The sensor control circuitry can include an application specific integrated circuit (ASIC) that is operatively coupled to excite the touch pixels and the force pixel at a common frequency.

In various implementations, the sensor control circuitry can include one or more of the following features. The sensor control circuitry can be responsive to at least first, second and third operating modes that differ from each other in an amount of power consumed by the sensor control circuitry and force and touch sensors. The first operating mode can be activated upon receiving one or more signals indicating that the earphones are not within a charging case and not within an ear of a user. The second operating mode can be activated upon a receiving one or more signals that the earphones are detected within an ear of a user while not being actively used. The third operating mode can be activated upon a receiving one or more signals that the earphones are detected within an ear of a user while being actively used. When in the first operating mode, the sensor control circuitry can electrically couple the plurality of touch pixels together and sample the plurality of touch pixels together as a single touch pixel. When in the third operating mode, the sensor control circuitry can monitor each of the plurality of touch pixels separately. When in the first operating mode, the sensor control circuitry can sample the force pixel and the plurality of touch pixels at a baseline frequency rate. When in the third operating mode, the sensor control circuitry can sample the force pixel and the plurality of touch pixels at a standard frequency that is substantially higher than the baseline frequency rate. When in the second operating mode, the sensor control circuitry can electrically couple the plurality of touch pixels together and sample the plurality of touch pixels together as a single touch pixel and force pixel at the standard frequency rate. The sensor control circuitry can be further responsive to fourth and fifth operating modes where, in each of the fourth and fifth operating modes the sensor control circuitry and force and touch sensors consume less power than in any of the first, second and third operating modes. The fourth operating mode can be activated upon receiving one or more signals that indicate the earphone is in the charging case and fully charged. The fifth operating mode can be activated upon receiving one or more signals that indicate the earphone is in the charging case and either not fully charged or that a lid of the charging case is open. When in the third operating mode, the sensor control circuitry can repeatedly perform a plurality of sensor status checks at a standard frequency rate. In each sensor status check, the sensor control circuitry can perform a plurality of operations including: detecting a noise level, detecting whether the force sensor has been activated, and individually detecting whether each of the plurality of touch pixels has been activated. The sensor control circuitry can execute a baseline procedure check at a baseline frequency rate that is at least an order of magnitude less than the standard frequency rate. During each baseline procedure check, the sensor control circuitry can perform a first plurality of operations in which a voltage signal is applied to the force and touch pixels at a first frequency and then perform a second plurality of operations in which the voltage signal is applied to the force and touch pixels at a second frequency, different from the first frequency. The plurality of first and second operations can each include: detecting a noise level, detecting whether the force sensor has been activated, and individually detecting whether each of the plurality of touch pixels has been activated.

According to some embodiments, a deformable ear tip is provided. The ear tip can include: an annular inner ear tip body having a sidewall extending between first and second opposing ends thereby defining a sound channel through the ear tip; an annular outer flange integrally formed with and surrounding the first end of the inner ear tip body and extending towards the inner ear tip second end forming an air gap between the annular inner ear tip body and the annular outer flange along a portion of a length of the ear tip, wherein the outer flange comprises a first material having a first durometer and is sized and shaped to be inserted into a human ear canal; and an inner flange integrally formed with the inner ear tip body and comprising a second material having a second durometer less than the first durometer, the inner flange body extending from a location along the inner ear tip body between the first and second ends towards an inner surface of the outer flange body.

In various implementations, the ear tip can include one or more of the following features. The outer flange can have a first radius of curvature and the inner flange can have a second radius of curvature greater than the first radius of curvature. The ear tip can be formed with a double shot injection molding process in which one shot forms the outer flange and an upper portion of the inner ear tip body and a second shot forms the inner flange and a lower portion of the inner ear tip body. The inner flange can extend fully around a perimeter of the inner ear tip body. The inner flange can physical contacts the inner surface of the outer flange. The inner flange can physically contact the inner surface of the outer flange at a location where the outer flange curves inward towards the inner ear tip body. The sidewall of the inner ear tip body can gradually vary in thickness from a first thickness at the first end to a second thickness at the second end. The second thickness can be greater than the first thickness. The ear tip can further include an annular rigid attachment structure coupled to the second end of the inner ear tip body. The annular rigid attachment member can include an attachment member sidewall that defines a central opening that is aligned with and forms part of the sound channel. The attachment member sidewall can include at least one control leak formed there through creating an acoustic pathway between an ambient environment and the sound channel.

According to some embodiments, an earphone charging case is provided. The charging case can include: a housing having a peripheral wall that defines a shell; a frame insert coupled to the housing and extending into the shell, the frame insert having one or more insert walls that define first and second pockets sized and shaped to accept first and second wireless earphones, respectively, wherein the one or more insert walls cooperate with the housing primary wall to define a sealed chamber within the charging case; a lid coupled to the housing and operable between a closed position in which the lid covers the first and second pockets and an open position in which the first and second pockets are exposed; a speaker module disposed within the sealed chamber, the speaker module comprising an audio driver having a diaphragm that separates a front volume of the audio driver from a back volume of the audio driver and a speaker vent disposed within the back volume; one or more first openings formed through the peripheral wall and opening into the front volume, wherein the audio driver is positioned and aligned to emit sound into the front volume and through the one or more acoustic openings; and one or more second openings formed through the peripheral wall at a location spaced apart from the front volume, wherein at least one of the one or more second openings is an acoustic vent acoustically coupled to the back volume of the audio driver through the speaker vent.

In various implementations, an earphone charging case can include one or more of the following features. The charging case can include a multi-layer mesh spanning across the acoustic vent. The multi-layer mesh can include an outer cosmetic mesh, an inner clad layer, and an acoustic mesh disposed between the cosmetic mesh and the clad layer. The inner clad layer can include a non-woven thermoplastic layer and a hydrophobic layer, and in some implementations the inner clad layer can include a non-woven polyethylene terephthalate (PET) mesh layer and a hydrophobic Polytetrafluoroethylene (PTFE) layer. The cosmetic mesh can include, for each of the one or more second openings, a protrusion that extends from within the housing into the respective second opening. The charging case can include an eyelet mechanically attached to a peripheral wall of the charging case. Each of the first and second pockets of the frame insert can include a generally tubular portion that extends from an upper portion of the housing towards a bottom surface of the peripheral wall. The charging case can include a wireless antenna that extends from a bottom portion of the housing towards an upper portion of the housing in an area between one of the first and second pockets and a side surface of the peripheral wall. The sealed chamber can be sealed in accordance within at least IPX4 requirements. The charging case can be less than 2½ inches long, less than 2 inches high and less than 1 inch deep. The charging case can include controller circuitry including a processor and memory, wherein the memory includes computer-readable instructions that, when executed by the processor, communicate with a host device to respond to commands to emit sound over the speaker. The charging case can include circuitry and an antenna that cooperate to wirelessly send a secure signal including information indicating a physical location of the charging case that can be detected by external devices over a wireless network.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Figure 1:
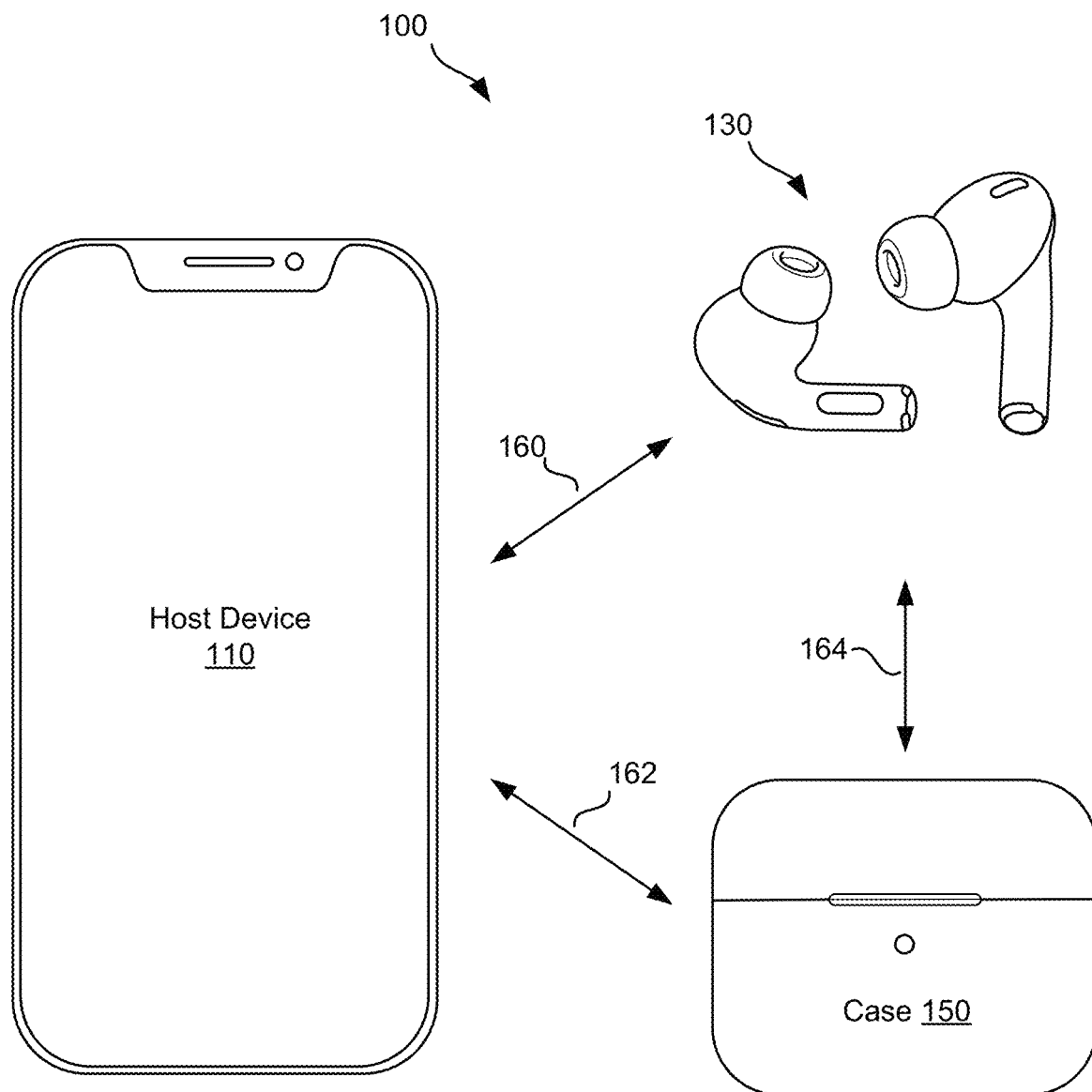
FIG. 1 is a simplified illustration of an exemplary portable electronic listening device system having a host device configured as a smart phone, a case, and a pair of wireless listening devices configured as earbuds, according to some embodiments.

Some embodiments of the disclosure pertain to a portable wireless listening that can deliver high-end acoustic performance to a user along with a pleasant and intuitive user experience. Other embodiments pertain to a case for charging and storing one or more portable wireless listening devices. Still other embodiments pertain to a system that includes both a pair of portable wireless listening devices and a charging case for the devices.

As used herein, the term "portable listening device" includes any portable device configured to be worn by a user and placed such that a speaker of the portable listening device is adjacent to or in a user's ear. A "portable wireless listening device" is a portable listening device that is able to receive and/or send streams of audio data from or to a second device without a wire connecting the portable wireless listening device to the second device using, for example, a wireless communication protocol.

Headphones are one type of portable listening device, headsets (a combination of a headphone and an attached microphone) are another and hearing aids (in-ear devices that are designed to augment sounds from the surrounding environment to improve a user's hearing) are still an additional type of portable listening device. As used herein, the term "headphones" represents a pair of small, portable listening devices that are designed to be worn on or around a user's head. They convert an electrical signal to a corresponding sound that can be heard by the user. Headphones, which can include a microphone incorporated within a housing component of the headphone, include traditional headphones that are worn over a user's head and include left and right earcups connected to each other by a headband, and earphones (very small headphones that are designed to be fitted directly in a user's ear). Traditional headphones include both over-ear headphones (sometimes referred to as either circumaural or full-size headphones) that have earpads that fully encompass a user's ears, and on-ear headphones (sometimes referred to as supra-aural headphones) that have earpads that press against a user's ear instead of surrounding the ear.

The term "earphones", which can also be referred to as ear-fitting headphones, includes both small headphones, sometimes referred to as "earbuds", that fit within a user's outer ear facing the ear canal without being inserted into the ear canal, and in-ear headphones, sometimes referred to as canal phones, that are inserted in the ear canal itself. Thus, earphones can be another type of portable listening device that are configured to be positioned substantially within a user's ear. As used herein, the term "ear tip", which can also be referred to as earmold, includes pre-formed, post-formed, or custom-molded sound-directing structures that at least partially fit within an ear canal. Ear tips can be formed to have a comfortable fit capable of being worn for long periods of time. They can have different sizes and shapes to achieve a better seal with a user's ear canal and/or ear cavity.

Example Wireless Listening System

FIG. 1 is an example of a wireless listening system 100 according to some embodiments. System 100 can include a host device 110, a pair of portable wireless listening devices 130 (e.g., left and right earphones) and a charging case 150. Host device 110 is depicted in FIG. 1 as a smart phone but can be any electronic device that can transmit audio data to portable listening device 130. Other, non-limiting examples of suitable host devices 110 include a laptop computer, a desktop computer, a tablet computer, a smart watch, an audio system, a video player, and the like.

As depicted graphically in FIG. 1, host device 110 can be wirelessly communicatively coupled with portable wireless listening devices 130 and charging case 150 through wireless communication links 160 and 162. Similarly, portable wireless listening devices 130 can be communicatively coupled to charging case 150 via wireless communication link 164. Each of the wireless communication links 160, 162 and 164 can be a known and established wireless communication protocol, such as a Bluetooth protocol, a WiFi protocol, or any other acceptable protocol that enables electronic devices to wirelessly communicate with each other. Thus, host device 110 can exchange data directly with portable wireless listening devices 130, such as audio data, that can be transmitted over wireless link 160 to wireless listening devices 130 for play back to a user, and audio data that can be received by host device 110 as recorded/inputted from microphones in the portable wireless listening devices 130. Host device 110 can also be wirelessly communicatively coupled with charging case 150 via wireless link 162 so that the host device 110 can exchange data with the charging case, such as data indicating the battery charge level data for case 150, data indicating the battery charge level for portable wireless listening devices 130, data indicating the pairing status of portable wireless listening devices 130.

Portable wireless listening devices 130 can be stored within case 150, which can protect the devices 130 from being lost and/or damaged when they are not in use and can also provide power to recharge the batteries of portable wireless listening devices 230 as discussed below. In some embodiments portable wireless listening devices 130 can also be wirelessly communicatively coupled with charging case 150 via wireless link 164 so that, when the devices are worn by a user, audio data from case 150 can be transmitted to portable wireless listening devices 130. As an example, charging case 150 can be coupled to an audio source different than host device 110 via a physical connection, e.g., an auxiliary cable connection. The audio data from the audio source can be received by charging case 150, which can then wirelessly transmit the data to wireless listening devices 130. That way, a user can hear audio stored on or generated by an audio source by way of wireless listening devices 130 even though the audio source does not have wireless audio output capabilities.

As will be appreciated herein, portable wireless listening devices 130 can include several features can enable the devices to be comfortably worn by a user for extended periods of time and even all day. Each portable wireless listening device 130 can be shaped and sized to fit securely between the tragus and anti-tragus of a user's ear so that the portable listening device is not prone to falling out of the ear even when a user is exercising or otherwise actively moving. Its functionality can also enable the wireless listening devices 130 to provide a user interface to host device 110 so that the user may not need to utilize a graphical interface of host device 110 for certain functions or operations of either the portable wireless listening devices or the host device. In other words, wireless listening devices 130 can be sufficiently sophisticated that they can enable the user to perform certain day-to-day operations from host device 110 solely through interactions with wireless listening devices 130. This can create further independence from host device 110 by not requiring the user to physically interact with, and/or look at the display screen of, host device 110, especially when the functionality of wireless listening devices 130 is combined with the voice control capabilities of host device 110. Thus, in some instances portable wireless listening devices 130 can enable a true hands free experience for the user.

Figure 2:
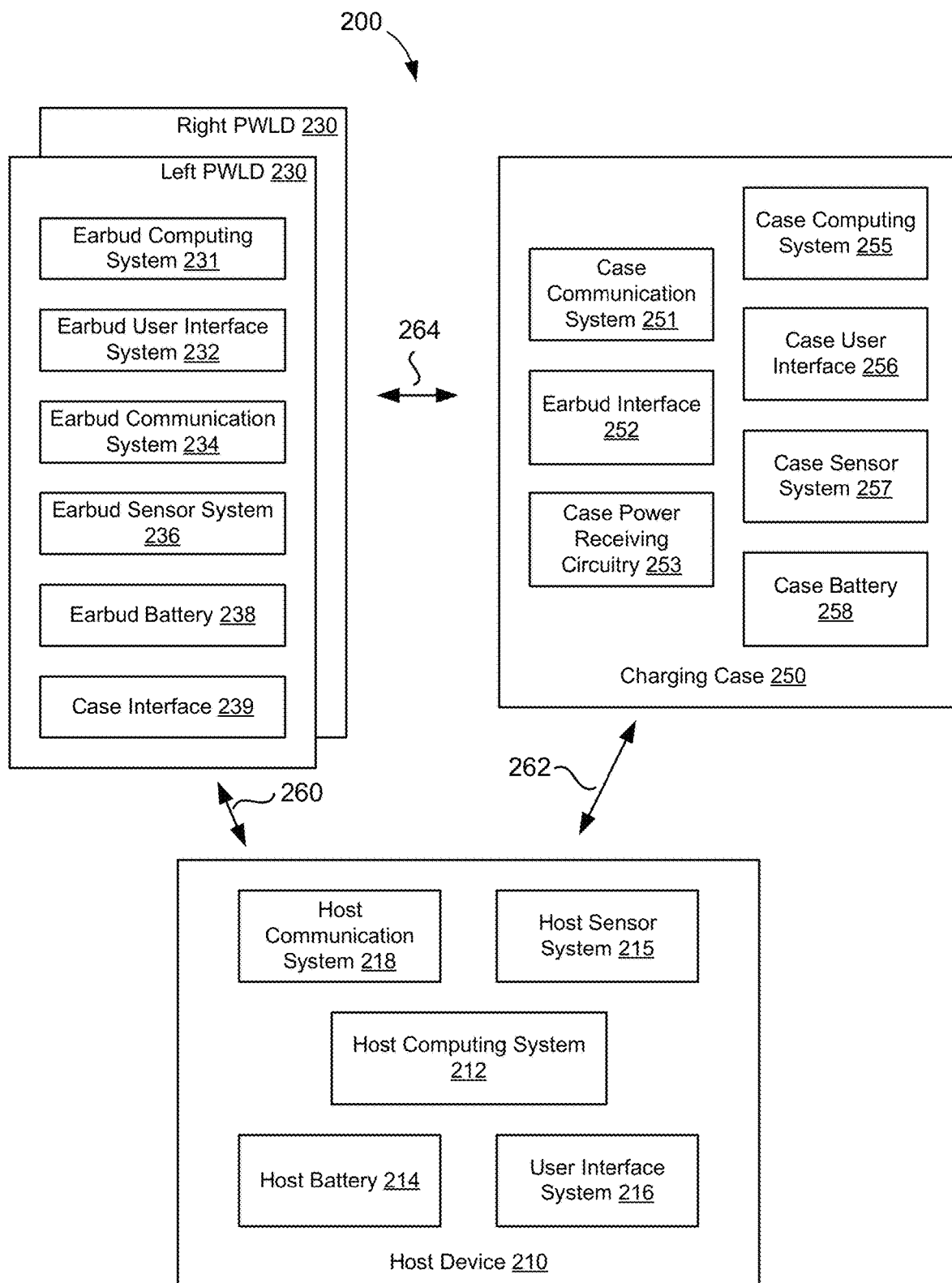
FIG. 2 is a simplified block diagram of various components of a portable wireless listening system according to some embodiments.

Details of an example earphone, which can be representative of each of the portable wireless listening devices 130 are discussed below. First, however, reference is made to FIG. 2, which is a simplified block diagram of various components of a wireless listening system 200 according to some embodiments that includes a host device 210, a pair of portable wireless listening devices (PWLDs) 230 (e.g., a right PWLD 230 and a left PWLD 230) and a charging case 250. System 200 can be representative of system 100 shown in FIG. 1 and host device 210, portable wireless listening devices 230 and charging case 250 can be representative of host device 110, portable wireless listening devices 130 and charging case 150, respectively. Each portable wireless listening device 230 can receive and generate sound to provide an enhanced user interface for host device 210. For convenience, the discussion below refers to a single portable wireless listening device 230, but it is to be understood that, in some embodiments, a pair of portable listening devices can cooperate together for use in a user's left and right ears, respectively, and each portable wireless listening device in the pair can include the same or similar components.

Portable wireless listening device 230 can include a computing system 231 that executes computer-readable instructions stored in a memory bank (not shown) for performing a plurality of functions for portable wireless listening device 230. Computing system 231 can be one or more suitable computing devices, such as microprocessors, computer processing units (CPUs), digital signal processing units (DSPs), field programmable gate arrays (FPGAs), application specific integrated circuits (ASICs) and the like.

Computing system 231 can be operatively coupled to a user interface system 232, communication system 234, and a sensor system 236 for enabling portable wireless listening device 230 to perform one or more functions. For instance, user interface system 232 can include a driver (e.g., speaker) for outputting sound to a user, one or more microphones for inputting sound from the environment or the user, one or more LEDs for providing visual notifications to a user, a pressure sensor or a touch sensor (e.g., a resistive or capacitive touch sensor) for receiving user input, and/or any other suitable input or output device. Communication system 234 can include wireless and wired communication components for enabling portable wireless listening device 230 to send and receive data/commands from host device 210. For example, in some embodiments communication system 234 can include circuitry that enables portable wireless listening device 230 to communicate with host device 210 over wireless link 260 via a Bluetooth or other wireless communication protocol. In some embodiments communication system 234 can also enable portable wireless listening device 230 to wirelessly communicate with charging case 250 via wireless link 264. Sensor system 236 can include proximity sensors (e.g., optical sensors, capacitive sensors, radar, etc.), accelerometers, microphones, and any other type of sensor that can measure a parameter of an external entity and/or environment.

Portable wireless listening device 230 can also include a battery 238, which can be any suitable energy storage device, such as a lithium ion battery, capable of storing energy and discharging stored energy to operate portable wireless listening device 230. The discharged energy can be used to power the electrical components of portable wireless listening device 230. In some embodiments, battery 238 can be a rechargeable battery that enables the battery to be repeatedly charged as needed to replenish its stored energy. For instance, battery 238 can be coupled to battery charging circuitry (not shown) that is operatively coupled to receive power from charging case interface 239. Case interface 239 can, in turn, electrically couple with earbud interface 252 of charging case 250. In some embodiments, power can be received by portable wireless listening device 230 from charging case 250 via electrical contacts within case interface 239. In some embodiments, power can be wirelessly received by portable wireless listening device 230 via a wireless power receiving coil within case interface 239.

Charging case 250 can include a battery 258 that can store and discharge energy to power circuitry within charging case 250 and to recharge the battery 238 of portable wireless power listening device 230. As mentioned above, in some embodiments circuitry within earbud interface 252 can transfer power to portable wireless listening device 230 through a wired electrical connection between contacts in charging case 250 that are electrically coupled to contacts in portable wireless listening device 250 to charge battery 238. While case 250 can be a device that provides power to charge battery 238 through a wired interface with device 230 in some embodiments, in other embodiments case 250 can provide power to charge battery 238 through a wireless power transfer mechanism instead of or in addition to a wired connection. For example, earbud interface can include a wireless power transmitter coil that can couple with a wireless power receiving coil within portable wireless listening device 230.

Charging case 250 can also include a case computing system 255 and a case communication system 251. Case computing system 255 can be one or more processors, ASICs, FPGAs, microprocessors, and the like for operating case 250. Case computing system 255 can be coupled to earbud interface 252 and can control the charging function of case 250 to recharge batteries 238 of the portable wireless listening devices 230, and case computing system 255 can also be coupled to case communication system 251 for operating the interactive functionalities of case 250 with other devices, including portable wireless listening device 230. In some embodiments, case communication system 251 includes a Bluetooth component, or any other suitable wireless communication component, that wirelessly sends and receives data with communication system 234 of portable wireless listening device 230. Towards this end, each of charging case 250 and portable wireless listening device 230 can include an antenna formed of a conductive body to send and receive such signals. Case 250 can also include a user interface 256 that can be is operatively coupled to case computing system 255 to alert a user of various notifications. For example, the user interface can include a speaker that can emit audible noise capable of being heard by a user and/or one or more LEDs or similar lights that can emit a light that can be seen by a user (e.g., to indicate whether the portable listening devices 230 are being charged by case 250 or to indicate whether case battery 258 is low on energy or being charged).

Host device 210, to which portable wireless listening device 230 is an accessory, can be a portable electronic device, such as a smart phone, tablet, or laptop computer. Host device 210 can include a host computing system 212 coupled to a battery 214 and a host memory bank (not shown) containing lines of code executable by host computing system 212 for operating host device 210. Host device 210 can also include a host sensor system 215, e.g., accelerometer, gyroscope, light sensor, and the like, for allowing host device 210 to sense the environment, and a host user interface system 216, e.g., display, speaker, buttons, touch screen, and the like, for outputting information to and receiving input from a user. Additionally, host device 210 can also include a host communication system 218 for allowing host device 210 to send and/or receive data from the Internet or cell towers via wireless communication, e.g., wireless fidelity (WiFi), long term evolution (LTE), code division multiple access (CDMA), global system for mobiles (GSM), Bluetooth, and the like. In some embodiments, host communication system 218 can also communicate with communication system 234 in portable wireless listening device 230 via a wireless communication link 262 so that host device 210 can send audio data to portable wireless listening device 230 to output sound, and receive data from portable wireless listening device 230 to receive user inputs. The communication link 262 can be any suitable wireless communication line such as Bluetooth connection. By enabling communication between host device 210 and portable wireless listening device 230, wireless listening device 230 can enhance the user interface of host device 210.

1. Earphones

Figure 3A:
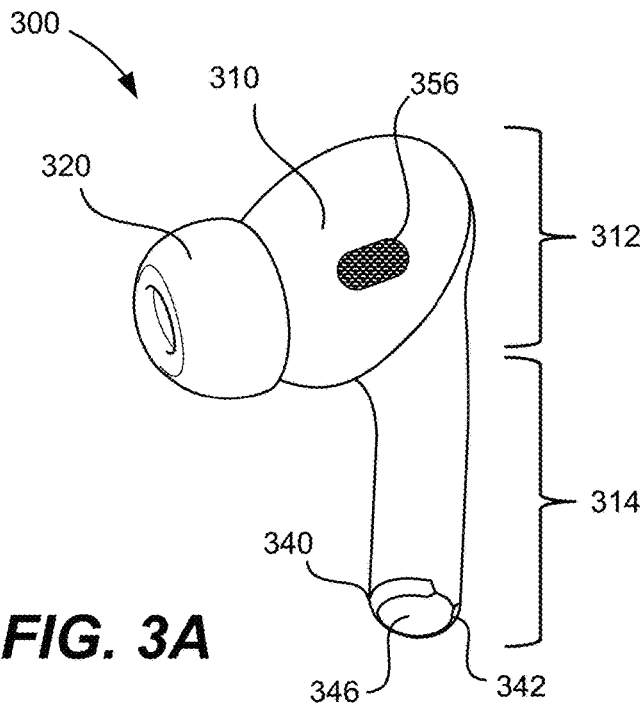
FIGS. 3A-3C are simplified views of a portable wireless earbud according to some embodiments.
Figure 3B:
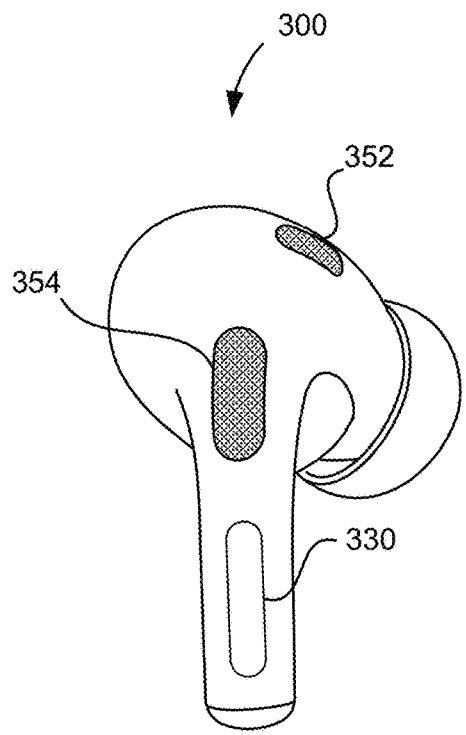
Figure 3C:
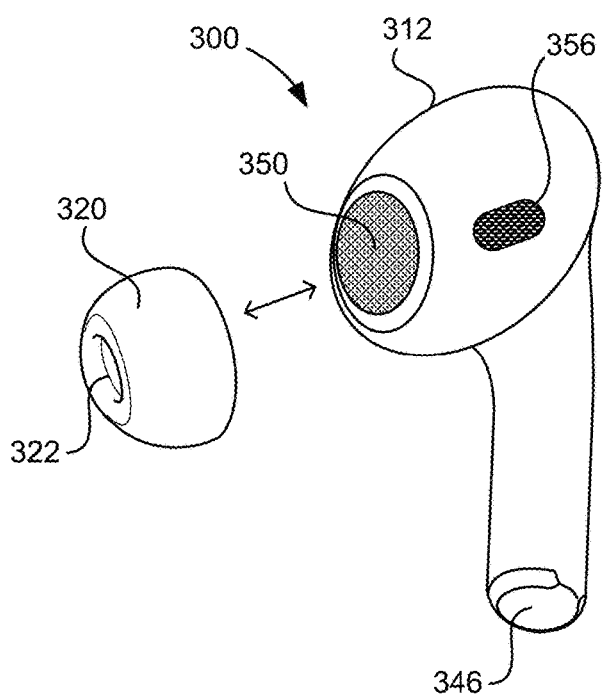

Portable wireless devices according to some embodiments can include a number of different features that provide a user with improved audio quality and a superior user experience as compared to many previously known portable wireless devices. To illustrate and explain some such features, reference is first made to FIGS. 3A-3C, which are simplified views of a wireless earphone 300. Specifically, FIG. 3A illustrates a front perspective view of a portable listening device according to an embodiment of the disclosure; FIG. 3B illustrates a rear perspective view of the portable listening device shown in FIG. 3A; and FIG. 3C illustrates a front perspective view of the portable listening device shown in FIG. 3A with its ear tip removed. Those skilled in the art will readily appreciate that the description of earphone 300 in FIGS. 3A-3C is provided for illustrative purposes only and that, as discussed above, while earphone 300 is an in-ear headphone that represents a specific example of a portable listening device according to some embodiments, embodiments of the invention are not limited to in-ear headphones or to the specific features of earphone 300 as discussed below.

Earphone 300 can include a housing 310 and an ear tip 320 that can direct sound from an internal audio driver (e.g., a speaker) out of housing 310 and into a user's ear canal. Housing 310 can be made from, for example, a hard radio frequency (RF) transparent plastic such as acrylonitrile butadiene styrene (ABS) or polycarbonate. In some embodiments, housing 310 can be made from one or more components that can be bonded together (e.g., with tongue and groove joints and an appropriate adhesive) to form a monolithic housing structure with a substantially seamless appearance.

Housing 310 can include a speaker housing 312 and a stem 314 extending from the speaker housing 312 at an angle. Stem 314 can be substantially cylindrical in construction, but it can include a planar region 330 that does not follow the curvature of the cylindrical construction. Planar region 330 can indicate an area where the wireless listening device is capable of receiving user input. For instance, a user input can be inputted by squeezing stem 314 at planar region 330 or sliding a finger along a portion of the planar region. Stem 314 can also include electrical contacts 340 and 342 for making contact with corresponding electrical contacts in charging case that can store and charge a pair of earphones 300. Electrical contacts 340, 342 provide a physical interface that can be electrically coupled with corresponding electrical contacts in a corresponding charging case (e.g., charging case 150). It is to be understood that embodiments are not limited to the particular shape and format of the housing 310 depicted in FIGS. 3A-3C. For example, in some embodiments the housing does not include a stem or similar structure and in some embodiments an anchor or other structure can be attached to or extend away from the housing to further secure the earbud to a feature of the user's ear.

Also shown in FIG. 3A is cap 346 that is part of overall housing 310 and can be affixed to an end of stem 314 forming a water tight seal with the stem. A bottom microphone (not shown) can be attached to an interior surface of cap 346 and the cap can include an acoustic port (not shown) that allows the microphone to capture sounds from the environment. Cap 346 can also include two seats along its external surface on opposite sides of the cap for the two contacts 340, 342. The two seats can be recessed a sufficient amount such that the contacts 340, 342 can be secured to the seats and positioned flush with an outer surface of cap 346 creating a smooth, seamless structure that has an improved appearance and reliability. An electrical connection to circuitry within stem 314 can be made to each of contacts 340, 342 through an appropriate cutout or opening in cap 346 that can be covered by the contacts.

In some embodiments housing 310 can be formed of a seemingly monolithic outer structure without any obvious seams or rough edges. Housing 310 can form a shell that defines an interior cavity (not shown) in which the various components of earphone 300 are positioned. For example, enclosed within housing 310 can be a processor or other type of controller, one or more computer-readable memories, wireless communication circuitry, an antenna, a rechargeable battery, power receiving circuitry and various sensors, such as an accelerometer, a photodetector, force and touch sensors and the like, none of which are shown in any of FIGS. 3A-3C. Housing 310 can also house an audio driver (i.e., a speaker) and one or more microphones. The speaker and one or more microphones can each be positioned within housing 310 at locations adjacent to audio openings that extend through housing 310 to allow the speaker and the one or more microphones to transmit and receive audio waves through the housing.

Some or all of such audio openings can be covered by a mesh. For example, as shown in FIG. 3C, a mesh 350 can be disposed over an audio port formed in speaker housing 312. A speaker can be positioned within the speaker housing and aligned to emit sound through the audio port, through mesh 350 and through a central channel 322 that extends through ear tip 320 into a user's ear canal. As another example, a rear vent can be formed through speaker housing 312 and covered with a mesh 352. The rear vent can be acoustically coupled to a back volume of the speaker housing to provide improved acoustic performance of the earphone. As still another example, a microphone port can formed through housing 310 at a location where speaker housing 312 and stem 314 are joined and covered by a mesh 354. A microphone can be disposed within housing 310 at a location adjacent to the microphone port such that the microphone can receive sound waves through mesh 354 and through the microphone port.

Earphone 300 can also include an optical sensor 356 that can be used to determine when the earphone is being worn within a user's ear. The optical sensor 356 can be strategically positioned at a location along housing 310 that is likely to be in contact with or directly facing an inner surface of the average user's ears when the earphone is worn by the user. In this manner, the optical sensor can be used, sometimes in conjunction with other sensors, to determine whether earphone 300 is worn by a user and positioned within the user's ear as discussed in more detail below. In some embodiments, the optical sensor can be positioned behind an optically transparent window that is positioned along speaker housing 310.

Ear tip 320 can be made primarily from a deformable material and can be sized and shaped to fit within a user's ear canal In the embodiment depicted in FIGS. 3A-3C, ear tip can be removably attached to speaker housing 310 and is shown in FIG. 3A in an attached state and in FIG. 3C in a detached stated.

2. Front Porting for ANC

One benefit that a deformable ear tip, such as ear tip 320, provides is that when the ear tip is inserted into a user's ear canal, the ear tip can form a seal with the inner wall of the ear canal attenuating or blocking out external noises. The seal between a deformable ear tip and the user's ear canal can form a closed acoustic architecture that enables the in-ear headphone to have improved noise cancellation features as opposed to earphones that have an open acoustic architecture.

Figure 4:
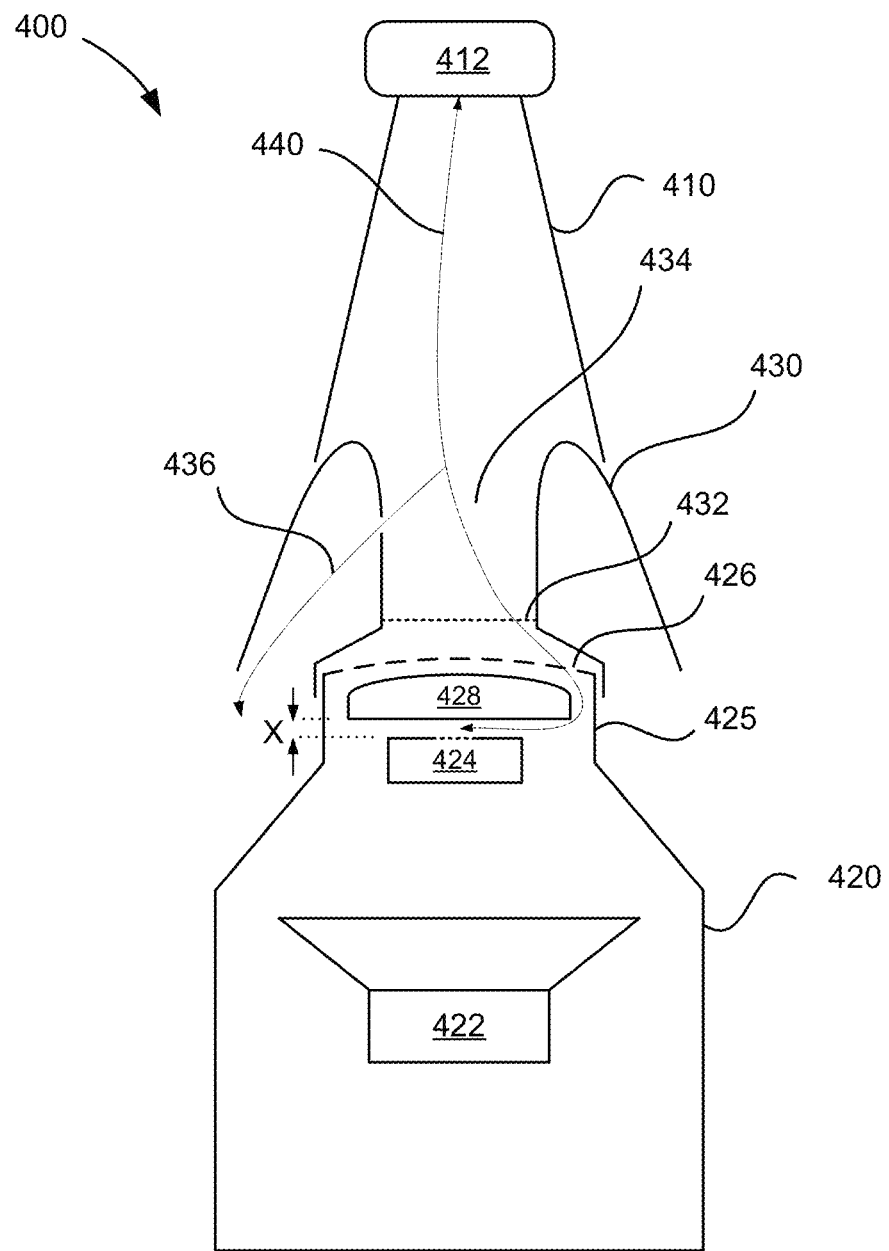
FIG. 4 is a simplified cross-sectional schematic diagram of a previously known in-ear earphone.

Some embodiments described herein pertain to earphones that have a deformable ear tip that enable a closed acoustic architecture with improved active noise cancellation. To illustrate, reference is first made to FIG. 4, which is a simplified cross-sectional illustration of an in-ear earphone 400. Earphone 400 includes a housing 420 an ear tip 430. As shown in FIG. 4, earphone 400 is being worn by a user with ear tip 430 inserted into an ear canal 410 of the user's ear and spaced apart from the user's ear drum 412. Earphone 400 represents a previously known earphone.

Housing 420 includes a nozzle 425 to which ear tip 430 can be removably attached. An audio driver 422 and microphone 424 are positioned within housing 420 and/or nozzle 425 that defines an audio port through which audio driver 422 can deliver sound. When ear tip 430 is coupled to nozzle 425, sound can travel from driver 422, through nozzle 425 and through an audio channel 434 formed in ear tip 430 to a user's ear drum. Nozzle 425 and ear tip 430 can include meshes 426 and 432, respectively, that extend across and cover an audio channel that extends through the nozzle and ear tip to prevent debris and earwax from invading housing 420. During use, a slight pressure can sometimes build up within ear canal 410 that some users find uncomfortable. To reduce such pressure, ear tip 430 can include a pressure leak path 436 that can be through, for example, one or more small openings in a wall of the ear tip that enable pressure from within ear canal 410 to escape to the ambient environment.

Microphone 424 can be employed in conjunction with circuitry (not shown) within the earphone 400 to implement an active noise canceling feature. Microphone 424 can be attached to housing 420 by a bridge 428, which is positioned between microphone 424 and the distal end of nozzle 425. An acoustic path 440 between ear drum 412 and microphone 424 extends through ear canal 410, ear tip 430 and meshes 432, 426, and around an outer periphery bridge 428 before reaching an audio opening of microphone 424, which can in itself be covered with a separate mesh or membrane as shown by the dotted line.

Figure 5:
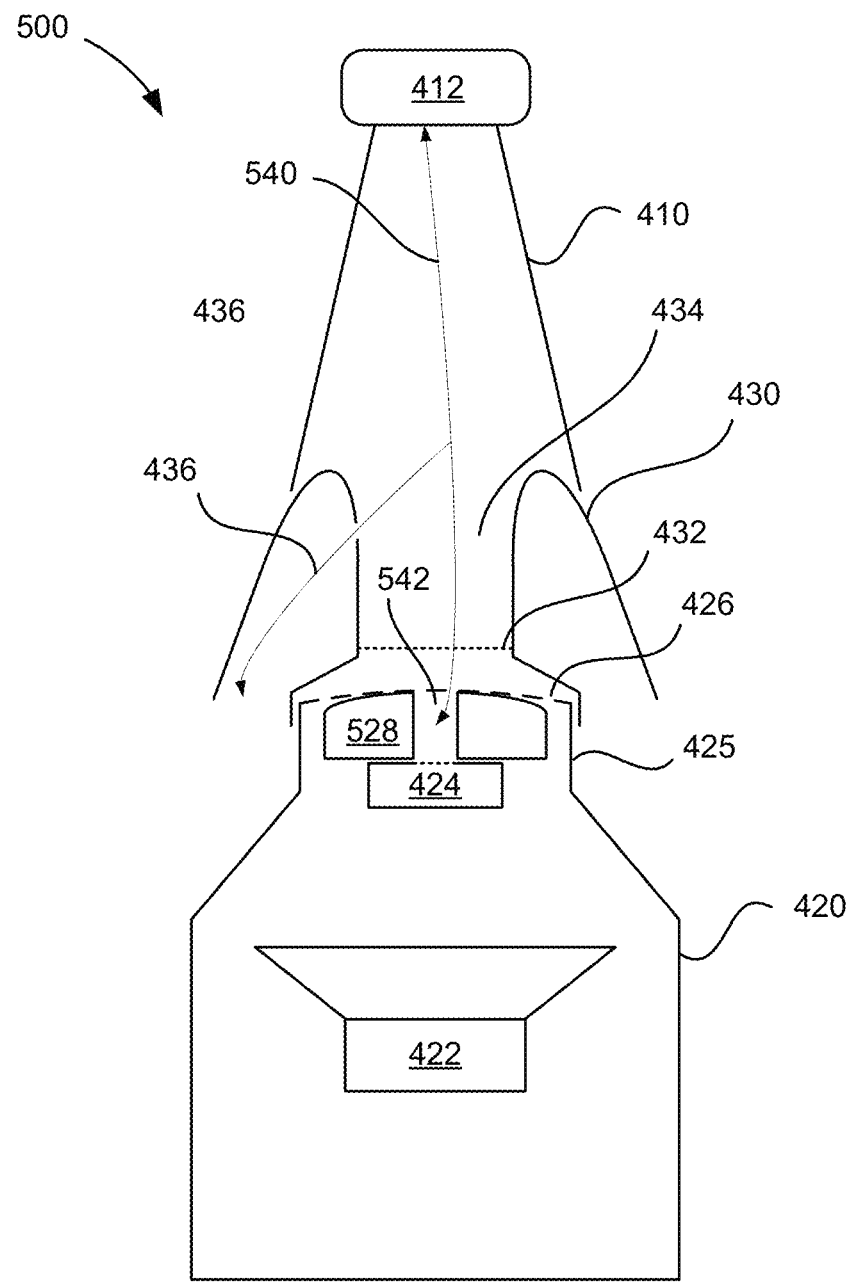
FIG. 5 is a simplified cross-sectional schematic diagram of an in-ear earphone according to some embodiments.

The inventors have found that in an ideal situation for noise canceling, the acoustic path between microphone 424 and ear drum 412 should be as short as possible to reflect any leakage that might occur either between the ear tip and ear canal or when there is an intentionally added leak path, such as pressure leak path 436. Embodiments disclosed herein provide an improved noise cancelling capabilities by shortening the acoustic path 440 without changing the structure of housing 420 or ear tip 430. FIG. 5 is a simplified cross-sectional illustration of an in-ear earphone 500 in accordance with some embodiments. Earphone 500 can include many of the same features as earphone 400 including, among others, housing 420, audio driver 422, microphone 424, nozzle mesh 426, ear tip 430 and ear tip mesh 432. Thus, for ease of explanation, the same reference numbers are used in FIG. 5 as used in FIG. 4 to indicate like elements. Also, similar to earphone 400 in FIG. 4, earphone 500 is depicted in FIG. 5 as being worn by a user with ear tip 430 inserted into an ear canal 410 of the user's ear and spaced apart from the user's ear drum 412.

As shown in FIG. 5, the acoustic path 540 between microphone 424 and a user's earbud 412 is more direct and shorter in earphone 500 than the similar acoustic path 440 in earphone 400. One difference between the two earphones is that bridge 528, which couples microphone 424 to housing 420 in earphone 500, includes a passageway 542 that extends between opposing upper surfaces of the bridge. Thus, acoustic pathway 540 extends directly through bridge 528 to get to microphone 422 rather than being diverted around an outer periphery of bridge 428 to get to the microphone as required in earphone 400. Allowing the acoustic pathway 540 to traverse bridge 528 through passageway 542 enables microphone 424 to be joined directly to a lower surface of bridge 528 thereby eliminating the gap X present between microphone 424 and bridge 428 in earphone 400 and moving the microphone closer to ear drum 412 further shortening the acoustic pathway 540.

Figure 6A:
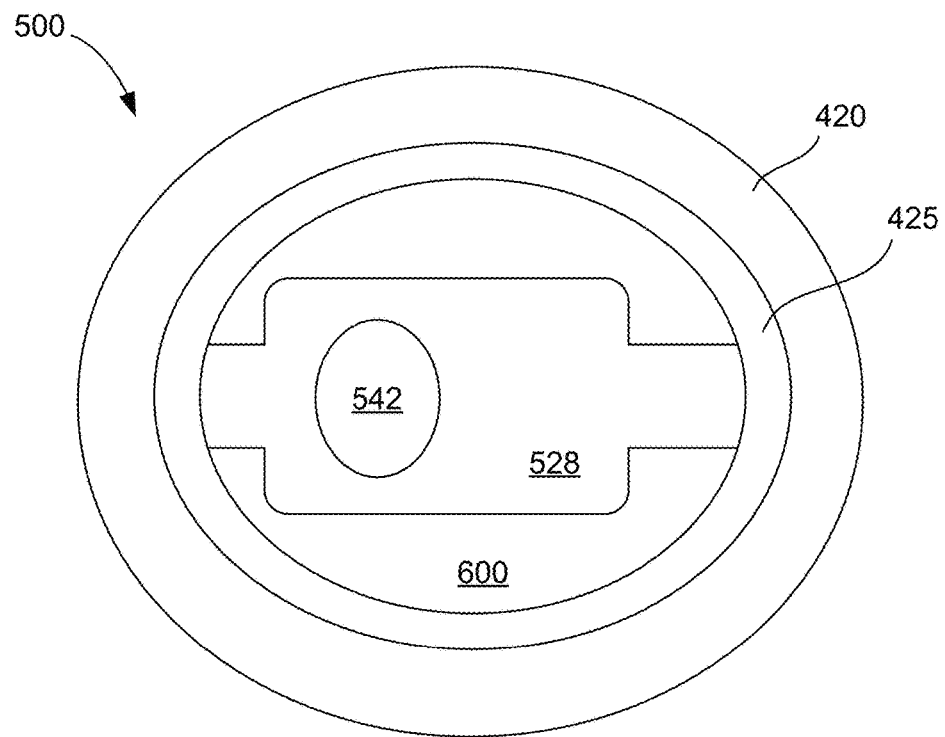
FIGS. 6A and 6B are simplified top plan and cross-sectional views of a nozzle portion of earphone according to some embodiments.
Figure 6B:
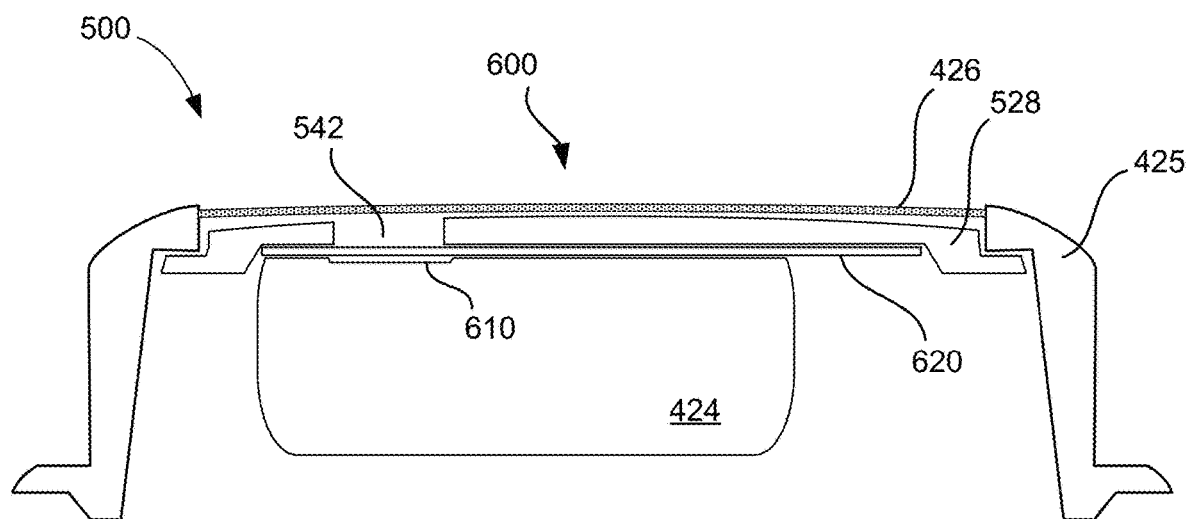

FIGS. 6A and 6B are simplified top plan and cross-sectional views of a portion of earphone 500 that includes nozzle 425. The nozzle 425 defines an audio port 600 that opens to the interior cavity of earphone housing 420. Mesh 426, which his not included in FIG. 6A to better illustrate other elements, extends across audio port 600 preventing debris and earwax from entering the interior of housing 420. Bridge 528 is positioned directly beneath the mesh 426 and can be mechanically attached to the wall of nozzle 425. Microphone 424 can be coupled to the bottom surface of bridge 528 such that an opening 610 to the microphone is aligned with passageway 542 through the bridge 528. A hydrophobic mesh 620 can be positioned between the microphone 424 and the bridge 528 and extend over the microphone opening 610 to prevent moisture and other particles that get past mesh 426 from entering the microphone. One or more adhesive layers (not shown), such as a PSA layer, can be disposed between the hydrophobic mesh and each of the bridge 528 and microphone 424 to secure the components together. In some embodiments, an airtight seal can be formed between microphone 424 and the bottom surface of bridge 528 to ensure that sounds that reach microphone 424 do so through passageway 540.

While passageway 542 in the embodiment depicted in FIG. 6B provides a direct line-of-sight path through the bridge 528 to the microphone 424, in other embodiments passageway 542 can have one or more bends along the length of the passageway creating a tortuous path from an upper surface of bridge 528 to microphone opening 610. Such a tortuous path can provide further protection to the microphone 424 against particles or other foreign objects from penetrating into the microphone and/or the acoustic membrane 620. In some embodiments, microphone 424 is joined to the bottom surface of bridge 528 with an airtight seal to ensure that sounds that reach microphone 424 do so through passageway 540.

3. Rear Vent and Mesh

Earphones according to various embodiments can include one or more openings that extend through an outer wall of the earphone housing. Different openings can serve different purposes. For example, a primary audio port can allow the speaker to transmit sound towards a user's ear, other openings can enable microphones to transmit and receive audio waves through the housing and still other openings can enable improved audio performance of the earphone. Some or all of such audio openings can be covered by a protective mesh as discussed with respect to FIGS. 3A-3C.

As a specific example of a protective mesh, a rear vent can be formed through speaker housing 312 and covered with a mesh 352 as shown in FIG. 3A. The rear vent can be acoustically coupled to a back volume of the speaker housing 312 to provide improved acoustic performance of the earphone. The protective mesh 352 can extend over the rear vent to prevent ear wax or particles from entering the housing through the rear vent. The protective mesh can be formed as a multi-layered structure including a cosmetic mesh and an acoustic mesh where the cosmetic mesh forms an outer surface of earbud 300 and is formed of an interlaced network of stiff wire, while the acoustic mesh is positioned within acoustic port 314 beneath the cosmetic mesh and is formed of a porous fabric. As a specific non-limiting example, the cosmetic mesh can be formed of interlaced stainless steel and the acoustic mesh can be formed of polyester.

Because earphones are worn directly in a user's ear, earphones are susceptible to a build-up or collection of wax that can collect on any or all of the meshes. Such wax can be particularly problematic on the meshes that come in physical contact with a portion of the ear, such as the mesh 352 formed over the rear vent. Wax build-up on mesh 352 can occlude the rear vent opening which can adversely impact the sound quality of an earphone. Earphones in accordance with some embodiments include an improved multi-layer mesh structure that reduces the impact of any potential wax build-up.

Figure 7:
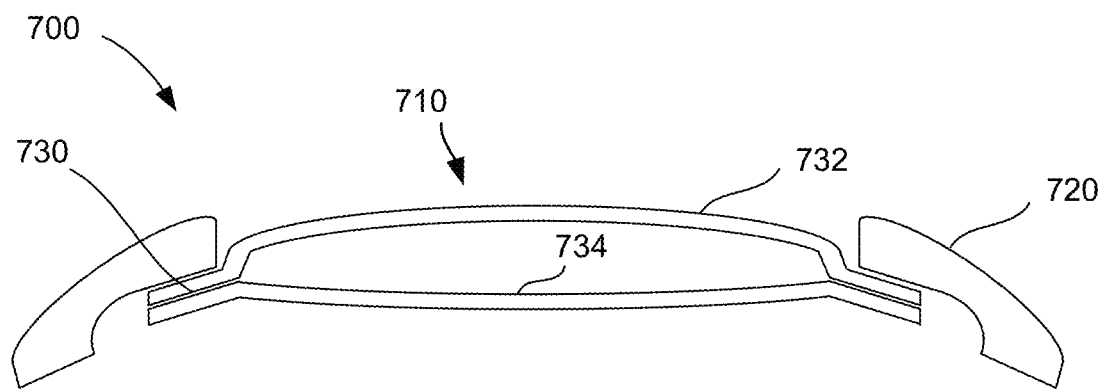
FIG. 7 is a simplified cross-sectional view of a portion of an earphone according to some embodiments.

FIG. 7 is a simplified cross-sectional view of a portion of an earphone 700 in accordance with some embodiments. Earphone 700 includes a rear vent 710 formed through a wall of a housing 720. A multi-layer protective mesh 730, which can be representative of mesh 352, covers rear vent 710. Mesh 730 can include an outer cosmetic mesh 732 disposed over a separate acoustic mesh 734. Importantly, acoustic mesh 734 is spaced apart from cosmetic mesh 732 in a central portion of rear vent 710. During use of earphone 700, ear wax can collect around the outer periphery of cosmetic mesh 732. As wax builds-up on the mesh, the wax can spread inward and eventually completely occlude rear vent 710. The spacing between acoustic mesh 734 and cosmetic mesh 732 allows more wax to collect on the cosmetic mesh before any such collected wax would completely occlude rear vent 710. Thus, the spacing increases the time to a possible occlusion event, which in turn reduces the frequency in which the multi-layer mesh 730 needs to be cleaned. As shown in FIG. 7, cosmetic mesh 732 can have a convex shape such that a center portion of the mesh protrudes further towards an exterior surface of earphone 700 than the peripheral portions of mesh 732.

Figure 8:
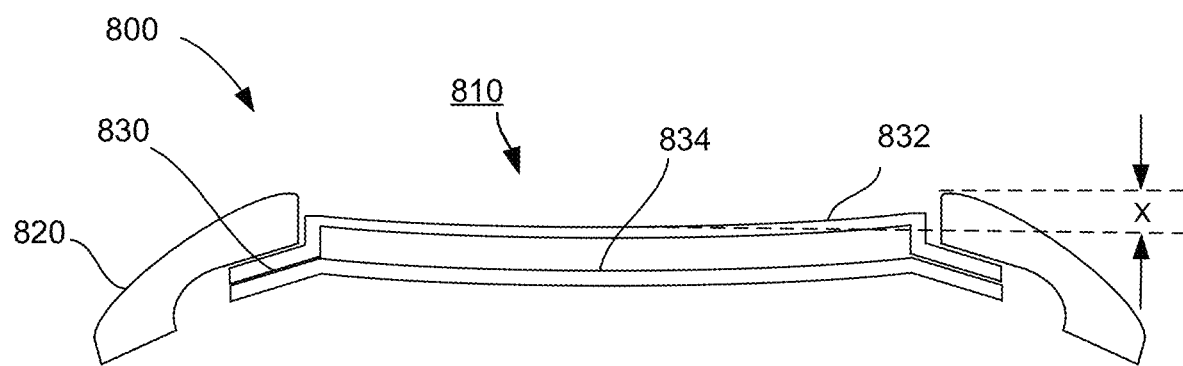
FIG. 8 is a simplified cross-sectional view of a portion of an earphone according to some embodiments.

In other embodiments, the cosmetic mesh can have a concave shape as shown in FIG. 8, which is a simplified cross-sectional view of a portion of an earphone 800 in accordance with some embodiments. As shown in FIG. 8, earphone 800 includes a rear vent 810 formed through a wall of a housing 820. A multi-layer protective mesh 830, which can also be representative of mesh 352, covers rear vent 810. Similar to mesh 730, mesh 830 can include an outer cosmetic mesh 832 disposed over an acoustic mesh 834 that is spaced apart from the cosmetic mesh 832 in a central portion of rear vent 810. The spacing between the two mesh layers allows more wax to collect on cosmetic mesh 832 before any such collected wax would completely occlude rear vent 810. Unlike cosmetic mesh 732, cosmetic mesh 832 has a concave shape to it such that the central portion of mesh 832 is spaced further from an exterior surface of earphone 800 than the peripheral portions of mesh 832. The concave shape creates a deeper, sub-flush mesh where the extra depth can further increase time to a possible occlusion event, which in turn can further reduce the frequency in which the multi-layer mesh 830 needs to be cleaned. The central portion of mesh 550 can still be recessed from the exterior surface of speaker housing 310 by a distance X, which in some embodiments can be between 0.1 and 1.5 mm.

Figure 9A:
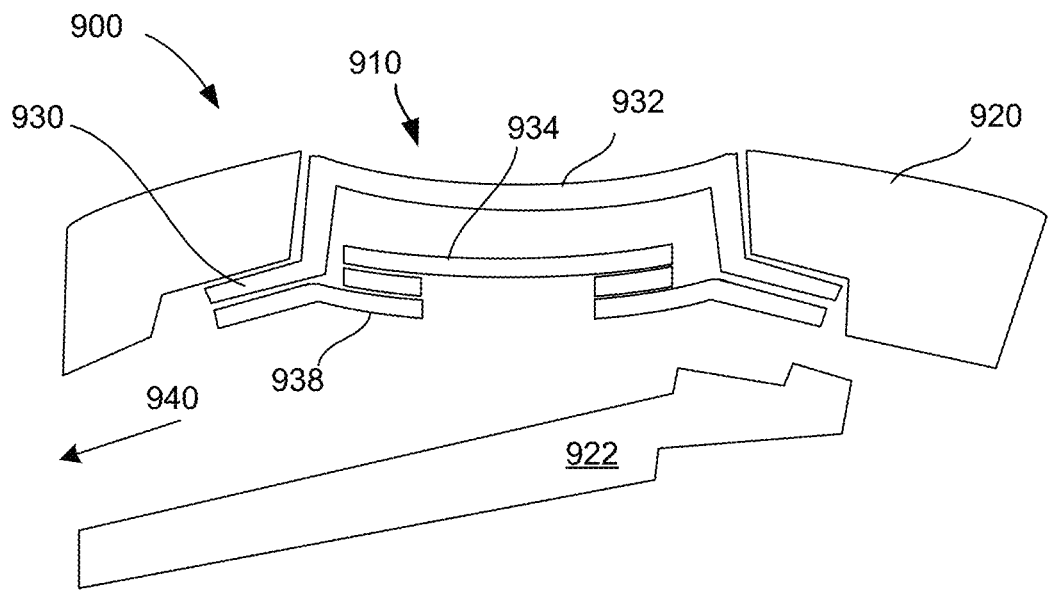
FIGS. 9A and 9B are simplified cross-sectional and exploded perspective views, respectively, of a multi-layer mesh according to some embodiments.
Figure 9B:
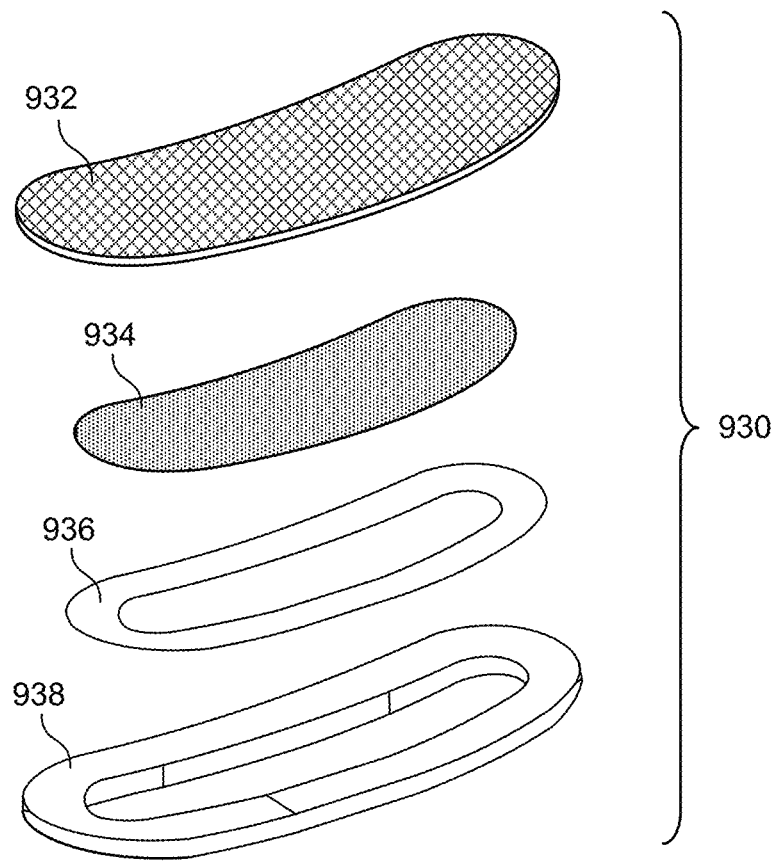

FIGS. 9A and 9B are simplified cross-sectional and exploded perspective views, respectively, of a multi-layer mesh 930 that can be representative of multi-layer mesh 830. In FIG. 9A, multi-layer mesh 930 is shown within a rear-vent 910 formed through a housing 920 of an earphone 900. Multi-layer mesh 930 includes an outer cosmetic mesh 932 and an inner acoustic mesh 934. A stiffener 938 provides support for the acoustic mesh, which can be bonded to stiffener 9386 by an adhesive layer 936, such as a pressure sensitive adhesive (PSA) layer. An acoustic frame 922 sits within housing 920 and can provide an indirect, sealed path 940 between rear vent 910 and the back volume (not shown) of the audio driver. The indirect path 940 can take the form of an elongated tubular acoustic passageway that can improve passive attenuation of earphone 900. The sealed tubular passageway can take a tortuous path between rear vent 910 and the back volume with bends in the path having curved edges to improve acoustic airflow and reduce "choking". In some embodiments, the tube dimensions can maintain a ratio of 0.8 height×2.0 width×3.5 functional length, and in some particular implementations, the tube dimensions can have a minimum height of about 0.8 mm.

4. User-Interaction: Pressure and Touch Sensing

Figure 10A:
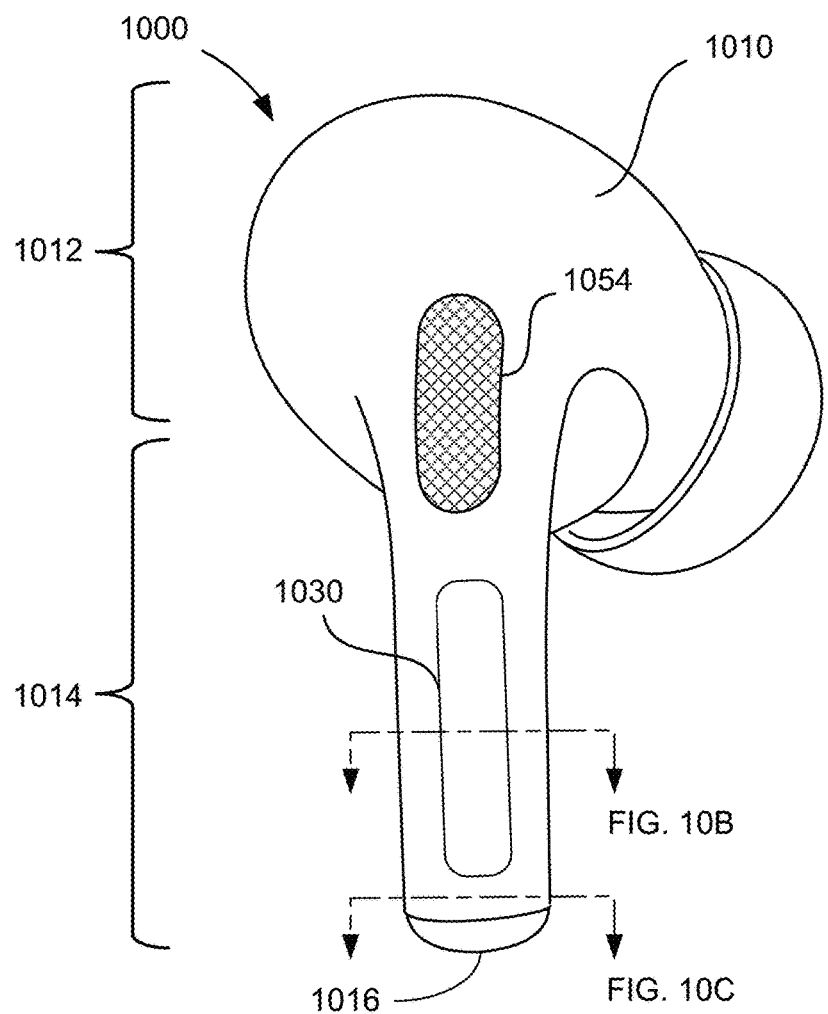
FIG. 10A is a simplified rear perspective view of an earphone having a touch-sensitive and pressure-sensitive user interface according to some embodiments.

Earphones according to some embodiments can include a user-input device positioned along an exterior surface of the earphone housing. In some embodiments, the user-input device can be a touch sensitive and pressure sensitive surface along a stem portion of the earphone housing, such as planar region 330 positioned along stem 312 of the earphones 300 depicted in FIGS. 3A-3C. FIG. 10A is a simplified rear perspective view of an earphone 1000 according to some embodiments. Earphone 1000 can be representative of earphone 300 and includes a housing 1010 having a speaker housing portion 1012 and a stem portion 1014.

As shown in FIG. 10A, stem 1014 has a substantially cylindrical in construction but the stem can have any appropriate shape in other embodiments. Stem 1014 defines an interior cavity (region 1045 shown in FIGS. 10B and 10C) extending along a length of the stem in which components of earbud 1000 are positioned. A planar region 1030 that does not follow the curvature of the cylindrical construction is disposed along a lower portion of stem 1014 between a distal end 1016 of the stem and a mesh 1054. The mesh 1054 overlies an audio port (not shown in FIG. 10) and a microphone (also not shown) disposed within housing 1010 at a location adjacent to the microphone port such that the microphone can receive sound waves through mesh 1054 and through the microphone port. Planar region 1030 can provide a tactile surface that indicates to a user an area where the earphone 1000 is capable of receiving user input. For instance, a user input can be inputted by squeezing stem 1014 at planar region 1030 or by sliding a finger along a portion of planar region 1030. A person of skill in the art will appreciate that planar region 1030 can be replaced by or enhanced by one or more other features that provide additional and/or improved tactile feedback including, as examples, bumps, grooves, recesses, etc.

Figure 10B:
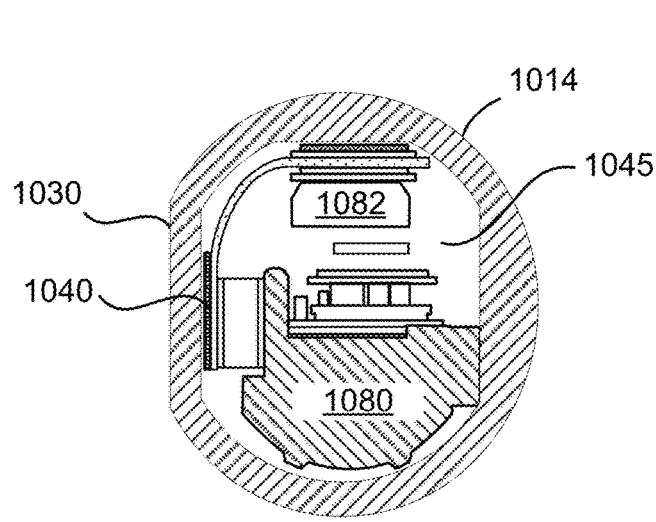
FIGS. 10B and 10C are simplified cross-sectional illustrations along a width of the stem portion of the earphone depicted in FIG. 10A according to some embodiments.
Figure 10C:
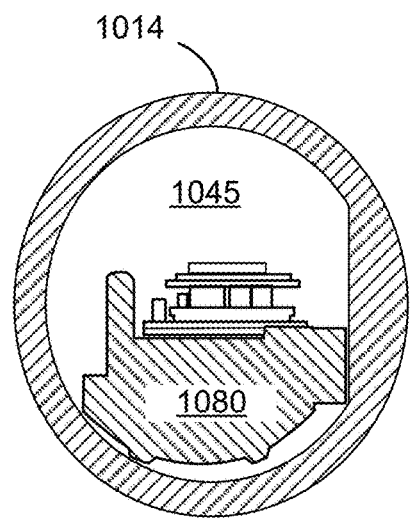

FIGS. 10B and 10C are simplified cross-sectional views of portions of stem 1030 along the different sections of the stem as indicated in FIG. 10A. As shown in the FIGS. 10B and 10C, planar region 1030 is present in FIG. 10B but not in FIG. 10C. FIG. 10B also shows a flex circuit board 1040 disposed adjacent to the planar surface 1030. Circuit board 1040 can include both force and touch sensors as described in more detail in conjunction with FIGS. 11A-11C below. Circuitry, such as an antenna 1080 that can extend along a majority of a length of the stem and system in a package (SIP) 1082, can also be disposed within interior region 1045 of stem 1014. SIP 1082 can include an ASIC that drives and monitors the force and touch sensors. In some embodiments, SIP 1082 or other separate circuitry disposed within region 1045 can further include: a main processor that controls the operation of earbud 1000; one or more computer-readable memories; charging circuitry; additional sensors, such an accelerometer, a gyroscope; a wireless communication controller; support components for antenna 1080; and uplink and downlink communication circuitry; among others. Including the SIP and its associated circuitry in stem portion 1014 of earbud 1000 enables the speaker housing portion 1012 to be smaller than it otherwise would be (while including an appropriate sized battery).

Figure 11A:
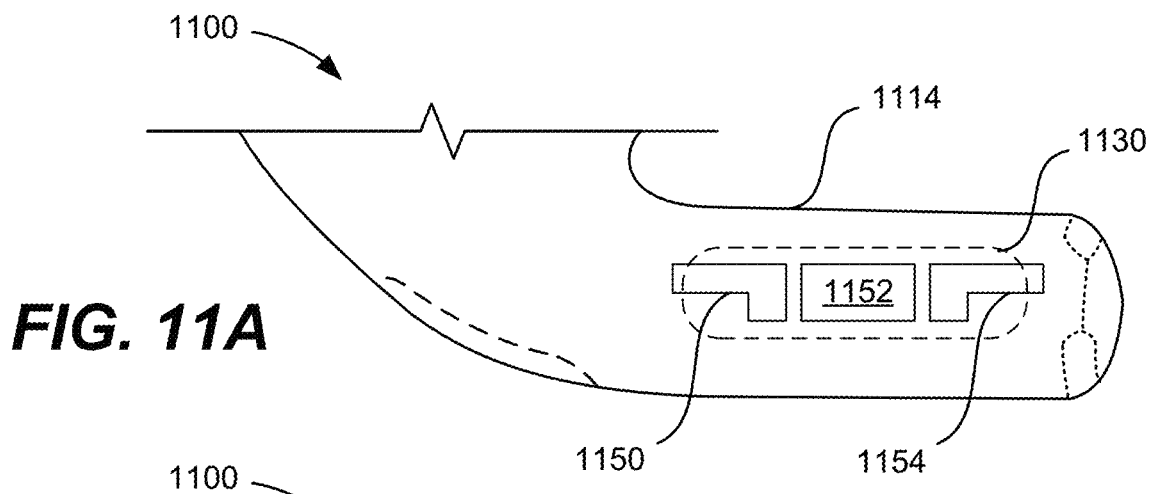
FIGS. 11A and 11B are simplified cross-sectional illustrations along a length of the stem portion of an earphone according to some embodiments.
Figure 11B:
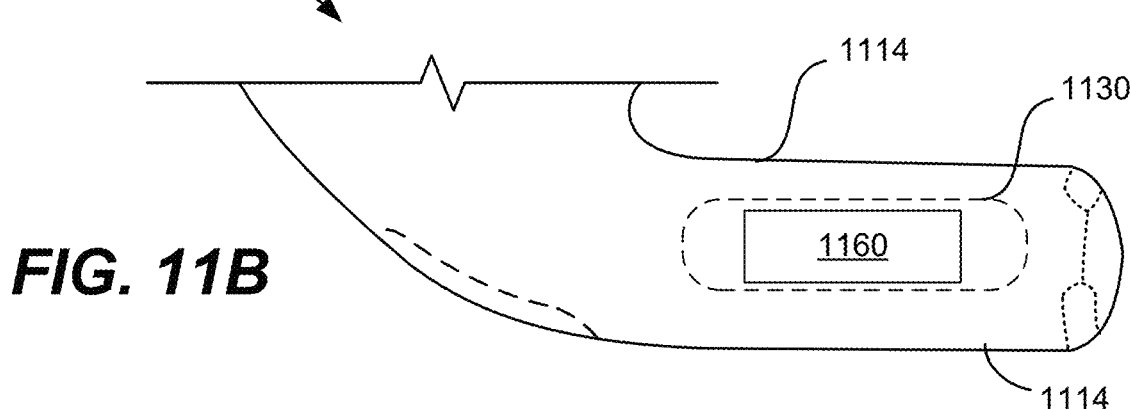
Figure 11C:
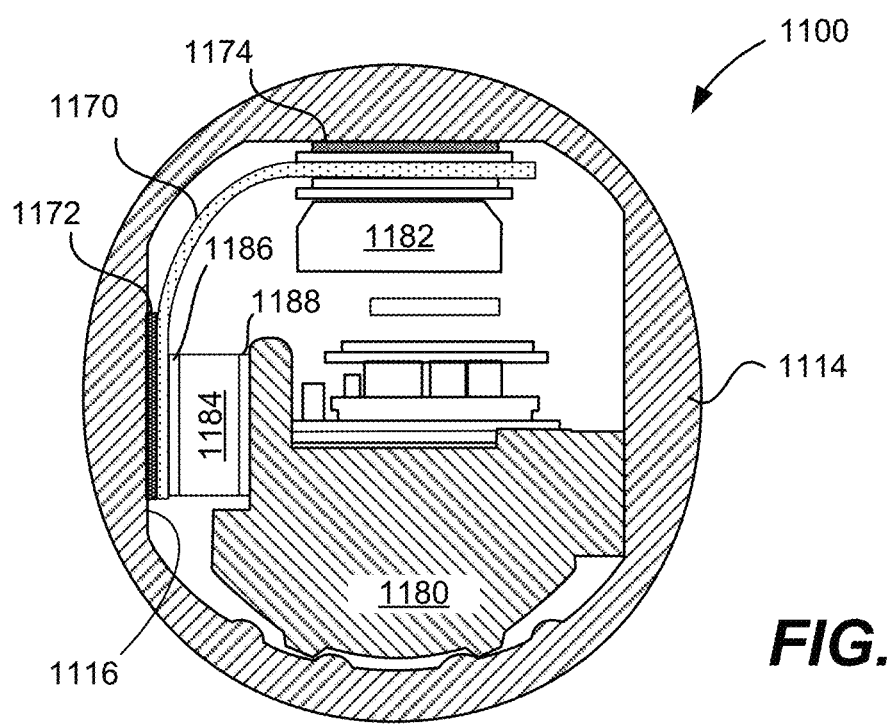
FIG. 11C is a simplified cross-sectional illustration along a diameter of the stem portion of an earphone in accordance with some embodiments.

Reference is now made to FIGS. 11A-11C that depict various views of an earphone 1100 according to some embodiments. Earphone 1100 can be representative of any of the earphones discussed above including earphone 300 and earphone 1000. FIGS. 11A and 11B are each simplified cross-sectional views at different depths along a length of a stem 1114, and FIG. 11C is a simplified cross-sectional illustration along the stem depicting a relationship between touch pixels and sense pixels within the stem. As shown in FIG. 11A, a planar region 1130 is disposed along stem 1114 and multiple touch pixels can be disposed directly under the surface of the planar region 1130. In the embodiment depicted in FIG. 11A, three separate and distinct capacitive touch pixels 1150, 1152 and 1154 are included in the touch region but embodiments are not limited to any particular number of touch pixels and other embodiments can include fewer than or more than three touch pixels. In some embodiments, the touch pixels can be built into copper layers formed in a flex circuit 1170 discussed below with respect to FIG. 11C.

As shown in FIG. 11B, which represents a cross-sectional view of planar region 1130 below the cross-sectional view depicted in FIG. 11A, a single capacitive force pixel 1160 is also disposed along stem 1114 directly under the surface of the planar region 1130 and directly under the touch pixels. While the embodiment depicted in FIG. 11B includes just a single force pixel in the touch region, other embodiments are not limited to any particular number of force pixels and other embodiments can include more than one force pixels.

A user can provide input to earphone 1100 through either or both the touch pixels and the force pixel. For example, in some embodiments a user can slide his or her finger along stem 1114, which can be detected by the touch pixels, to change the volume of an audio stream played over earphone 1100. As another example, a user can squeeze stem 1114 at the planar region 1130, which can be detected by the force pixel, to initiate a voice-activated, virtual assistant, such as Siri that is built into various Apple products, and/or answer a cellular telephone or other call over earphone 1100.

The capacitive touch pixels and force pixel can be formed in or bonded to a common flex circuit 1170, which in turn, can be laminated to an inner surface of stem wall 1116. In some embodiments, the touch pixels 1152, 1154, 1156 can be formed directly on an upper surface of a flex circuit 1170 as shown in FIG. 11C with their sensing surface facing outward toward wall 1116, while the force pixel 1160 can be disposed on a lower surface of flex circuit 1170 in an opposite orientation facing inward. The force pixel can be arranged such that a foam layer 1184 fills the force sensor gap between the first and second capacitive pads 1186 and 1188 of the force pixel. Foam layer 1184 can be a high dielectric material and can mechanically secure the force sensor to antenna 1180. When a user squeezes stem 1114 in the planar region 1130, the flex 1170 is pushed toward electrode 1188 and the gap between the two electrodes 1186, 1188 is reduced creating a change in capacitance that can be detected generating a user-input signal that can be acted upon by electronics within earbud 1100 to carry out a predetermined function as noted above.

In some embodiments, first capacitor pad 1186 is formed as part of a copper layer or layers or as a conductive coating contained within or laminated to a bottom surface of flex circuit 1170 and the second capacitor pad 1188 of is built into the antenna ground. In other embodiments, first capacitor pad can be a conductive element bonded to flex circuit 1170 and/or both capacitor pads 1186 and 1188 can have a voltage on them in a mutual capacitance arrangement.

In some embodiments, flex circuit 1170 is laminated to the inner surface of wall 1116 using a low temperature curable adhesive (e.g., adhesive 1172). The accuracy of the capacitive touch pixels 1150, 1152 and 1154 can be dependent on the lamination process. The adhesive should be able to withstand internal stresses from spring back forces associated with squeezing the stem region to activate the force sensor. The inventors have found that a standard pressure sensitive adhesive can be inadequate in such circumstances as air bubbles can start to form over repeated use that can then interfere with the accuracy of the capacitive touch pixels. Instead, in some embodiments the adhesive is cross-linking adhesive formulated as b-stage system in which a first low temperature cure step partially cures the adhesive material and is followed by a UV cure step to fully cure the adhesive and bond the laminate to the wall. Additionally, to ensure a strong bond between wall 1116 and flex circuit 1170, in some embodiments the flex circuit 1170 is a separate flex dedicated to the touch and force pixels. In this manner, flex 1170 can be inserted into stem 1114 and fully bonded to the inner surface of wall 1116 (e.g., by adhesive layers 1172 and 1174) prior to mechanically attaching other components to the stem.

Since both the touch pixels 1150-1156 and the force pixel 1160 are capacitive, shared sensor control circuitry, such as a single ASIC (not shown), within SIP 1182 can be used to control the operation of both the touch sensor and the force sensor. That is, the single ASIC can be operatively coupled to the both the touch and force sensor to excite the sensors at one or more frequencies and to detect signals from both sets of sensors. For example, the single ASIC can capture signals from both the touch pixels and the force pixel in the same time frame. Using shared sensor control circuitry, such as a single ASIC, to control both the touch and force sensors can save a considerable amount of battery power enabling earphones 1100 to be used longer between charges.

To further facilitate reducing battery power, earphones according to some embodiments can employ different modes of operation depending on whether the earphones are being worn in a user's ear, are inside their charging case or are out of the case but are off the user's ear and thus not being worn. Towards this end, embodiments of earphones disclosed herein can include one or more sensors (e.g., photodiodes, magnets, hall effect sensors, an accelerometer, and the like) that can detect whether an earphone is within a charging case or within a user's ear.

Figure 12:
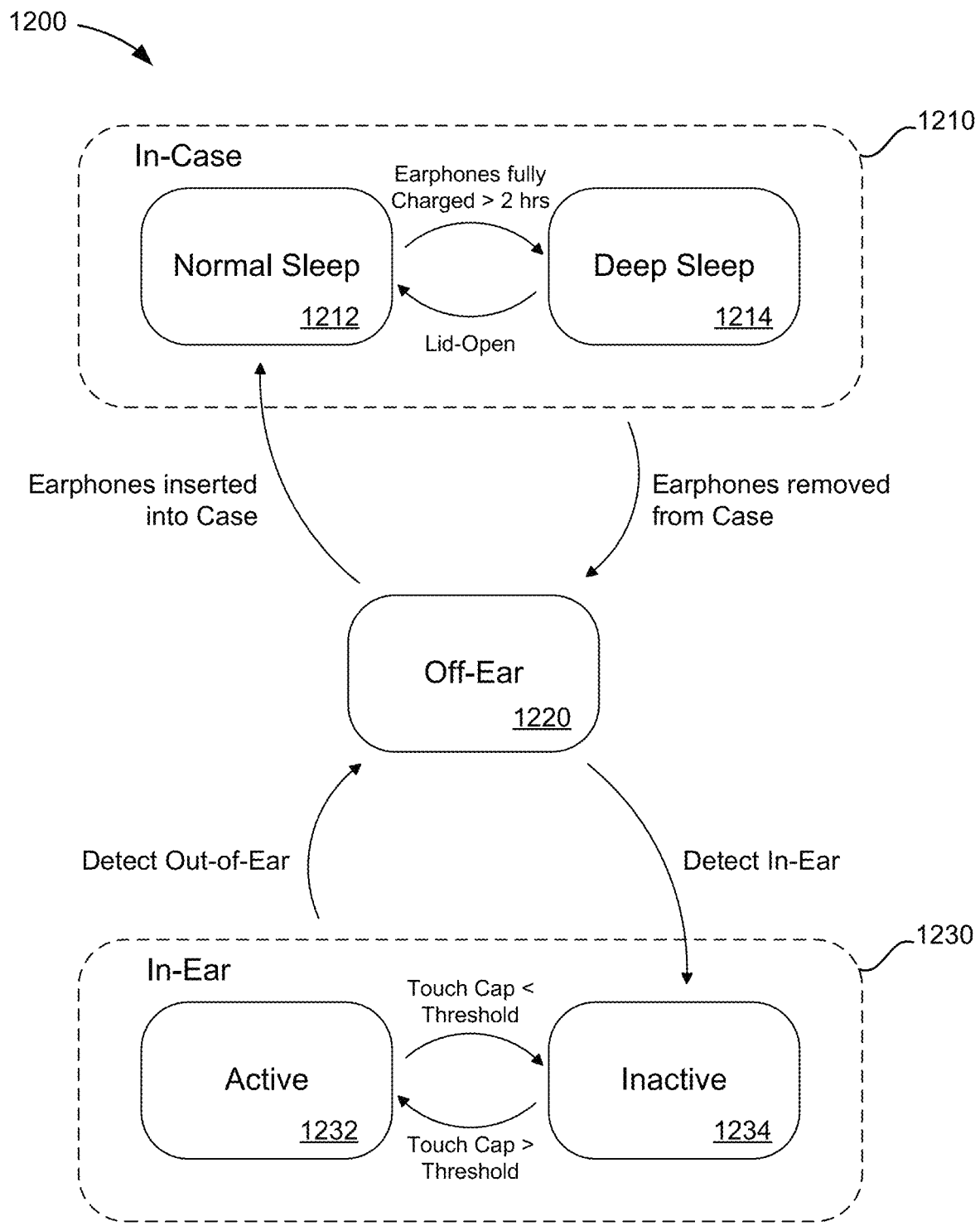
FIG. 12 is a state diagram depicting the different power modes according to some embodiments.

FIG. 12 is a state diagram 1200 depicting the different power modes according to some embodiments. As shown in FIG. 12, there are three primary states: In-case (state 1210), Off-ear (state 1220), and In-ear (state 1230). In-case states 1210 has two sub-states: low power sleep (sub-state 1212) and deep sleep (sub-state 1214), and in-ear state 1230 also includes two sub-states: active (sub-state 1232) and inactive (sub-state 1234).

To explain the power savings associated with the different states and sub-states, assume that a pair of earphones, such as any of earphones described herein including, but not limited to, earphones 300, 1000 1100, have been stored in a charging case with the battery for each earphone fully charged overnight. In the morning, the earphones, still in the charging case, will be in a deep-sleep sub-state 1214 in which both the touch and the force pixels are turned fully OFF. When the user opens the lid to the charging case, the earphones switch from deep sleep sub-state 1214 to a normal sleep sub-state 1212 in which the touch pixels are maintained OFF but the force pixel is turn ON and sampled at a low, baseline rate to save power. In various embodiments the baseline rate can be less than 10 Hz, less than 5 Hz, less than 2 Hz or less than 1 Hz. In one particular implementation, the baseline rate can be 0.5 Hz.

When sensors within the earphone detect that it is first removed from its charging case, the earphone enters off-ear mode 1220 in which both the touch and the force sensors are sampled at the low, baseline rate. If the sensors detect that the earphone is then inserted into the ear of a user, the earphone can initially switch to an inactive sub-state 1234 in which the touch and force sensors are sampled is substantially increased to a standard mode rate. In inactive sub-state 1234, the touch pixels are tied together into a single electrode to determine if a finger is present anywhere within the touch region and a baseline update is performed in the background at the baseline rate as described below in conjunction with FIG. 13. In various embodiments, the standard rate can be at least five times the baseline rate, at least ten times the baseline rate, at least fifty times the baseline rate or at least 100 times the baseline rate. In one particular implementation where the baseline rate is 0.5 Hz, the standard rate can be 60 Hz.

While in a user's ear, the earphone will remain in the inactive sub-state unless the touch pixels detect the presence of a finger, which can be done, for example, when the capacitance on the touch pixels is greater than a predetermined inactive threshold value. Once a finger is detected, the earphones switch to active sub-state 1232 in which the capacitance on the touch pixels can be independently measured on each touch pixel and the touch pixels and force pixel are sampled at the standard rate. The earphone can remain in active sub-state 1232 until either: (1) the capacitance on each touch pixel drops below a predetermined active threshold value and no touch was detected on any of the touch pixels for at least predetermined time period, which in some embodiments can be 500 msec, or (2) the earphone are removed from the user's ear in which case they are switched into off-ear state 1220.

Figure 13:
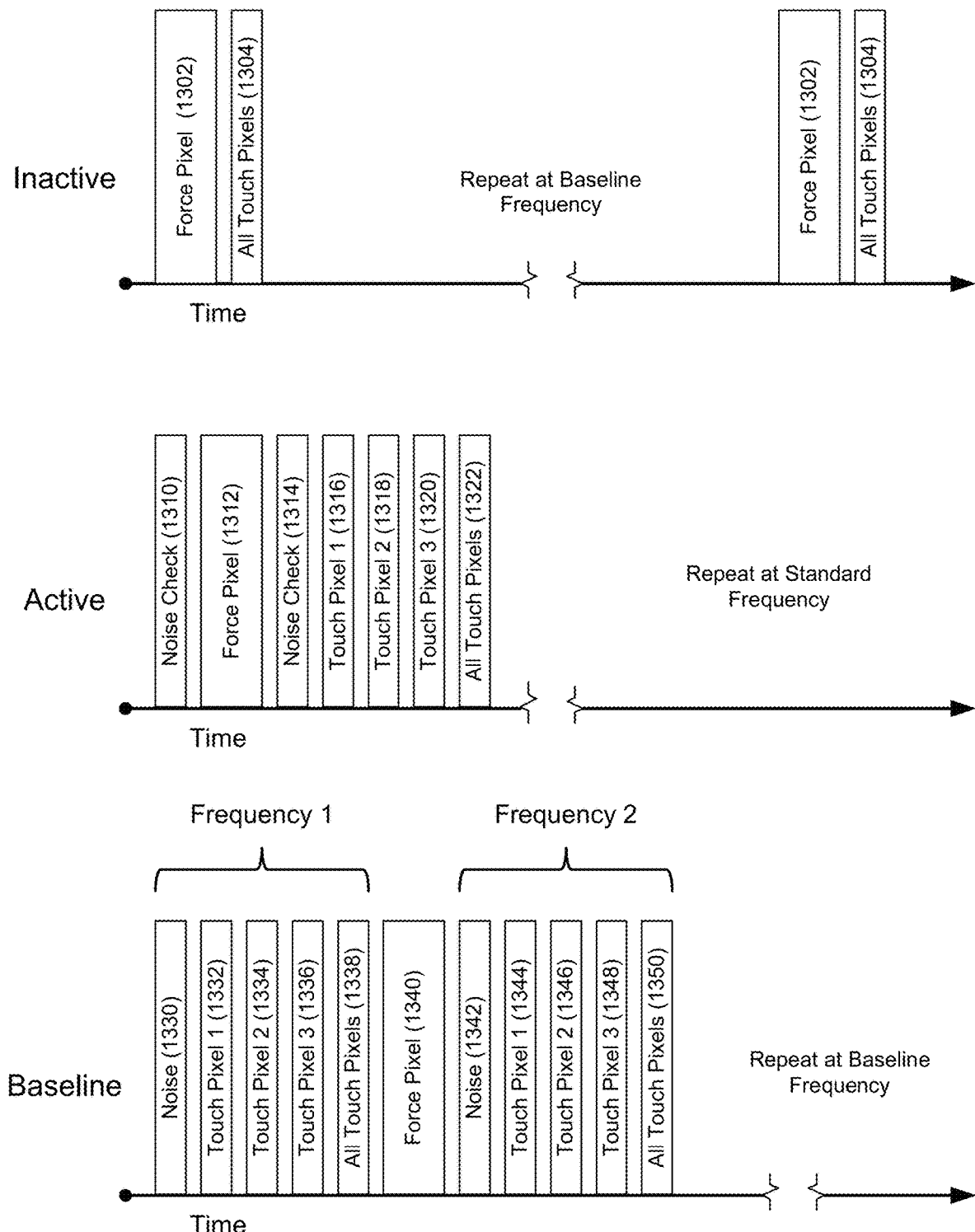
FIG. 13 is a simplified timing chart depicting sequences of steps associated different states of operation of an earphone according to some embodiments.

Further details of the manner and rate at which the touch and/or force pixels are sampled in inactive sub-state 1234, in active sub-state 1232 and in the baseline update according to some embodiments are set forth in FIG. 13, which is a simplified timing chart depicting sequences of steps associated with each of the inactive and active sub-states and the baseline update process. As shown in FIG. 13, inactive sub-state 1234 includes two separate steps where the force pixel is sampled (step 1302) and then the touch pixels (step 1304). As noted above, instead of sampling each touch pixel individually, in order to save power, all the touch pixels can be electrically tied together by circuitry within flex 1170 and sampled together in step 1304. If sufficient capacitance is detected on the combined touch pixel (e.g., capacitance greater than or equal to a first predetermined threshold) to indicate that a finger is positioned along the touch sensors, the earphone can be switched into active sub-state 1232. If capacitance above the first predetermined threshold is not detected and the earphones are still within the ear of the user, the earphones will remain in the inactive sub-state and repeat sampling the force and combined touch pixels (steps 1302 and 1304) at the baseline frequency, which if 0.5 Hertz means the steps 1302 and 1304 are repeated every two seconds.

When earphones switch from inactive sub-state 1234 to active sub-state 1232, the frequency at which the force and touch pixels are sampled substantially increases as noted above. For example, if the inactive sub-state samples the force and touch pixels at a rate of 0.5 Hz (once every two seconds) and the active rate samples the force and touch pixels at a rate of 60 Hz (60 times per second), the sampling frequency increases 120 times between the two states. In addition to increasing the sampling frequency, each touch pixel is looked at individually so the earphone can determine the location of a user's touch within the user input region (e.g., planar region 330). The higher sampling rate in the active sub-state allows the earphone to determine the direction a finger is moved across the user input region when a swipe motion is performed.

In addition to sampling the force and touch pixels, active sub-state 1232 includes a noise detection routine. When sampling the force and touch pixels, the earphone applies a voltage signal at an appropriate frequency that can be, for example, in the kilohertz range to one of the capacitor plates of each sensor. In some instances, an external source can create interference on the capacitor that could be wrongly interpreted by the earphone as a detection event. Thus, earphones according to some embodiments look for noise on the sensors and can implement a noise hopping scheme in which the voltage signal applied to the sensor capacitor plates is switched from a first frequency to a second frequency if noise above a predetermined threshold is detected on the first frequency.

As an example, when a user holds a smart phone up near his or her ear, circuitry within the smart phone can be in relative close proximity to an earphone in the user's ear and create noise within the earphone that might otherwise look like a detection event. To eliminate the possibility of noise incorrectly triggering a detection event, earphones according to some embodiments can choose between two different frequencies to excite (drive) the capacitors of the touch sensors and active sub-state 1232 can include two separate noise checks: a first noise check (step 1310) at frequency 1 and a second check (step 1314) at frequency 2. If noise is found on frequency 1 and not frequency 2, the touch pixels are driven (steps 1316-1322) at frequency 2. If noise is found on frequency 2 and not frequency 1, the touch pixels are driven (steps 1316-1322) at frequency 1. In the unlikely event that noise is found on both frequency 1 and frequency 2, the touch pixels can be temporarily blocked from controlling features of the earphone until the noise disappears from at least one of the two frequencies. In some particular implementations, frequency 1 is 200 KHz and frequency 2 is 510 KHz. As shown in FIG. 13, in some embodiments the noise check steps 1310 and 1314 are sandwiched around sampling the force pixel (step 1312). The sequence of the steps shown in FIG. 13 for the inactive sub-state, active sub-state and the baseline update can be varied, however, and embodiments are not limited to any particular order of such steps.

FIG. 13 also illustrates the various steps associated with a baseline update process in which noise thresholds can be established for the sampling frequencies at which the touch sensors are driven. In some embodiments, an initial baseline update is performed when the earphones are still in their charging case upon detecting that the lid of the case is opened. The baseline process will check for noise on frequency 1 (step 1330) and scan the touch sensors at frequency 1 (steps 1332-1338) and then do the same for frequency 2 (noise check at step 1342 and touch sensor scans at steps 1444-1450). The amount of noise that is present on each frequency can then be taken into account when setting a threshold levels for registering a detection event on each frequency. Additionally, in some embodiments the baseline update can also include checking the force pixel (step 1340), which in FIG. 13 is shown as being performed between the two frequency scans as an example timing sequence. The baseline update can then be repeated during active sub-state 1332 at the slower, baseline rate in order to maintain a baseline for noise at the frequency that is not being used to drive the touch pixels at that time.

5. Double-flange Ear Tip

Figure 14:
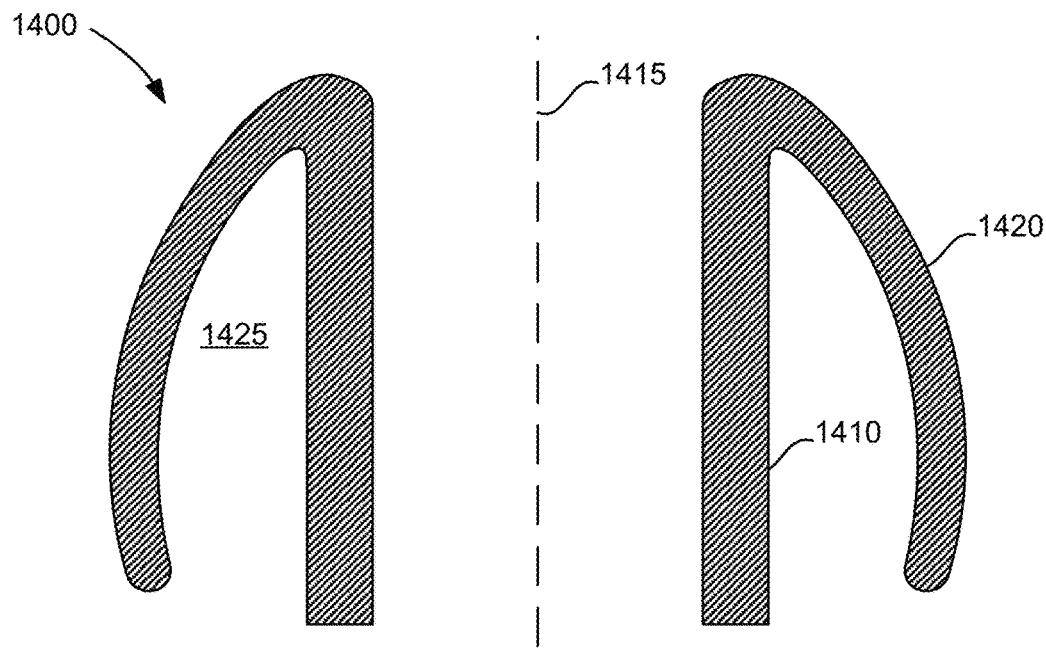
FIG. 14 is a simplified cross-sectional illustration of a previously known ear tip.

Ear tips that are in common use today are typically a monolithic structure made from a deformable material (e.g., silicone or a thermoplastic elastomer). As an example, FIG. 14 is a simplified cross-sectional view of a typical deformable ear tip 1400. Ear tip 1400 includes an inner ear tip body 1410 and an outer ear tip body (sometimes referred to as a flange) 1420 that together form a monolithic structure. Inner ear tip body 1410 is centered along a central axis 1415 and defines a sound channel that extends through the entire length of ear tip 1400. The sound channel is an empty space through which sound travels from an audio driver within the earphone to which ear tip 1400 is attached to a user's eardrum. Outer ear tip body 1420 is attached to inner ear tip body 1410 at one end of the ear tip 1400 (an ear interfacing end) and extends outwardly towards the second, opposite end of ear tip 1400 creating a gap or vacant space 1425 between the outer and inner ear tip bodies along at least a portion of a length of ear tip 1400.

When ear tip 1400 is inserted into an ear canal, outer ear tip body 1420 can bend into vacant space 1425 and conform to the contours of the ear canal to form an acoustic seal to prevent sound from entering the ear canal as ambient noise. Some surfaces of the ear canal can cause the outer ear tip body to unevenly press against the ear canal, which can create pressure points and cause discomfort. Additionally, only some portions of the outer ear tip body might make contact with the ear canal, thereby forming a weak seal that can allow noise from the environment to interfere with sound delivered by the earphone.

Figure 15:
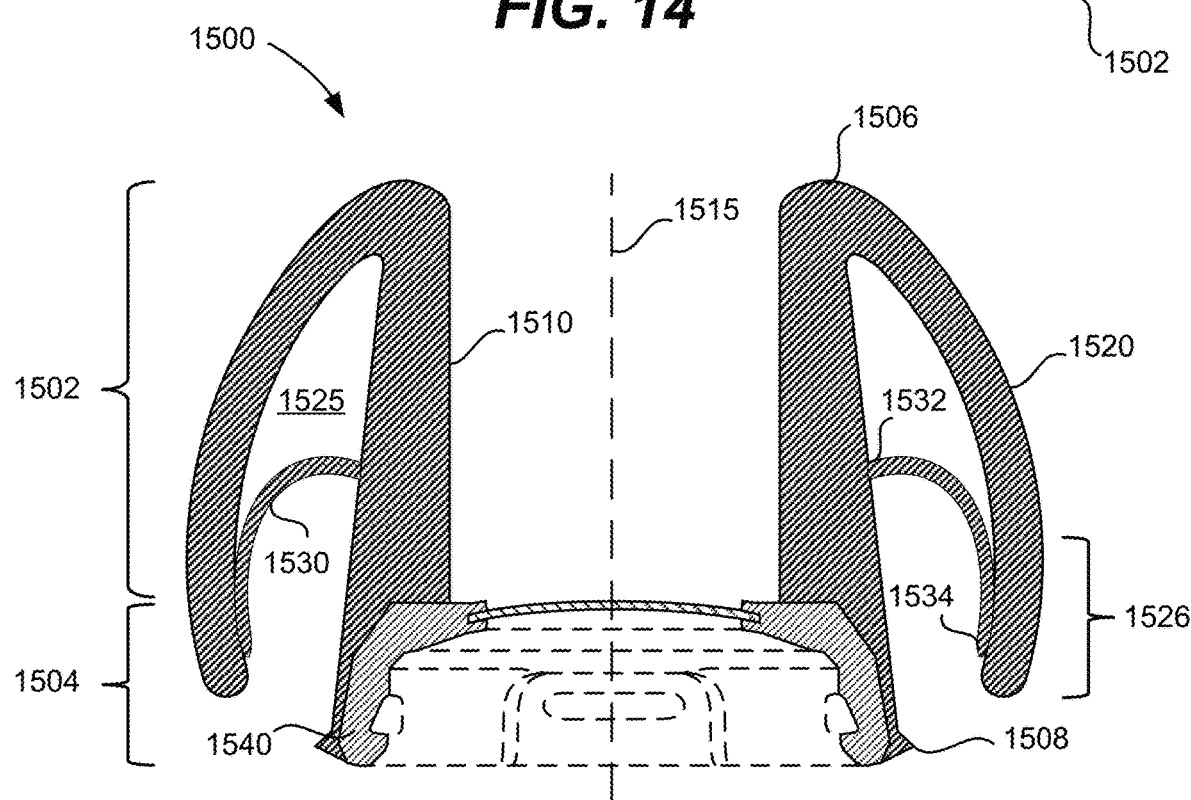
FIG. 15 is a simplified cross-sectional illustration of a double flange ear tip according to some embodiments.

In some embodiments, the earphones described herein can include a second flange structure between the outer ear tip body and the inner ear tip body to provide improved user comfort and improved acoustic performance. The second flange structure can resist uneven deformation of the outer ear tip body so that pressure is spread evenly across the inner surface of the ear canal, thereby mitigating the creation of pressure points to improve comfort and acoustic seal. FIG. 15 is a simplified cross-sectional view of a double flange ear tip 1500 according to some embodiments. Ear tip 1500 can include an inner ear tip body 1510 and an outer ear tip body 1520 that is sometimes referred to herein as outer flange 1520. Inner ear tip body 1510 is centered along a central axis 1515 and defines a sound channel that extends through the length of ear tip 1500.

Ear tip 1500 can include a tip region 1502 and a base region 1504. Tip region 1502 can be a part of ear tip 1500 that inserts into the ear canal of a user while base region 1504 can be a part of ear tip 1500 that extends toward and attaches to a housing (e.g., a nozzle or similar outer structure) of an earphone. In some embodiments, the attachment region includes an attachment structure 1540 for securely attaching ear tip 1500 to a corresponding earphone. As mentioned herein, the inner and outer ear tip bodies can be formed from a compliant material that enables the ear tip to be inserted within and form a seal with the ear canal. Compliant materials may not easily attach to stiff structures such as a housing of an earphone. Thus, attachment structure 1540 can be included in some embodiments to provide rigidity to the base region 1504 of ear tip 1500 enabling the ear tip to be securely to an earphone housing.

Outer ear tip body 1520 can be a part of tip region 1502. The outer ear tip body 1520 is attached to inner ear tip body 1510 at an ear-interfacing end 1506 of the ear tip 1500 and extends outwardly towards an earphone attachment end 1508 creating a gap 1525 between the outer and inner ear tip bodies along at least a portion of a length of ear tip 1500. Ear tip 1500 further includes an inner flange structure 1530 that is connected at a first end 1532 to inner ear tip body 1510 at a point between ear interfacing end 1506 and attachment end 1508. Inner flange structure 1530 extends into gap 1525 between inner ear tip body 1510 and outer ear tip body 1520 and can include a second end 1534 that contacts a distal portion 1526 of outer ear tip body 1520. When ear tip 1500 is inserted into the ear canal, outer ear tip body 1520 can compress inward against inner flange structure 1530. In some embodiments, second end 1534 is not fixedly attached to ear tip body 1520 and the lower portion 1528 of ear tip body 1520 can slide along the second end providing a force against the outer ear tip body 1520 that resists uneven deformation of outer ear tip body 1520. In this manner, inner flange 1530 can enable an improved acoustic seal of the ear tip 1500 within the user's ear and a passive attenuation gain for improved acoustic performance.

In some embodiments, inner flange structure 1530 is a single continuous structure that fully surrounds an outer periphery of inner ear tip body 1510. In other embodiments, inner flange structure 1530 can instead include multiple portions spaced apart from each other and formed radially around the outer periphery of inner ear tip body 1510. Additionally, in some embodiments, such as the embodiment depicted in FIG. 15, a radius of curvature of inner flange 1530 as it extends away from inner ear tip body 1510 is greater than a radius of curvature of outer ear tip body 1520 extending away from inner ear tip body 1510. The increased curvature of the inner flange 1530 minimizes potential sticking between the inner flange and outer ear tip body and also minimizes the possibility of inner flange 1530 becoming inverted.

Figure 16:
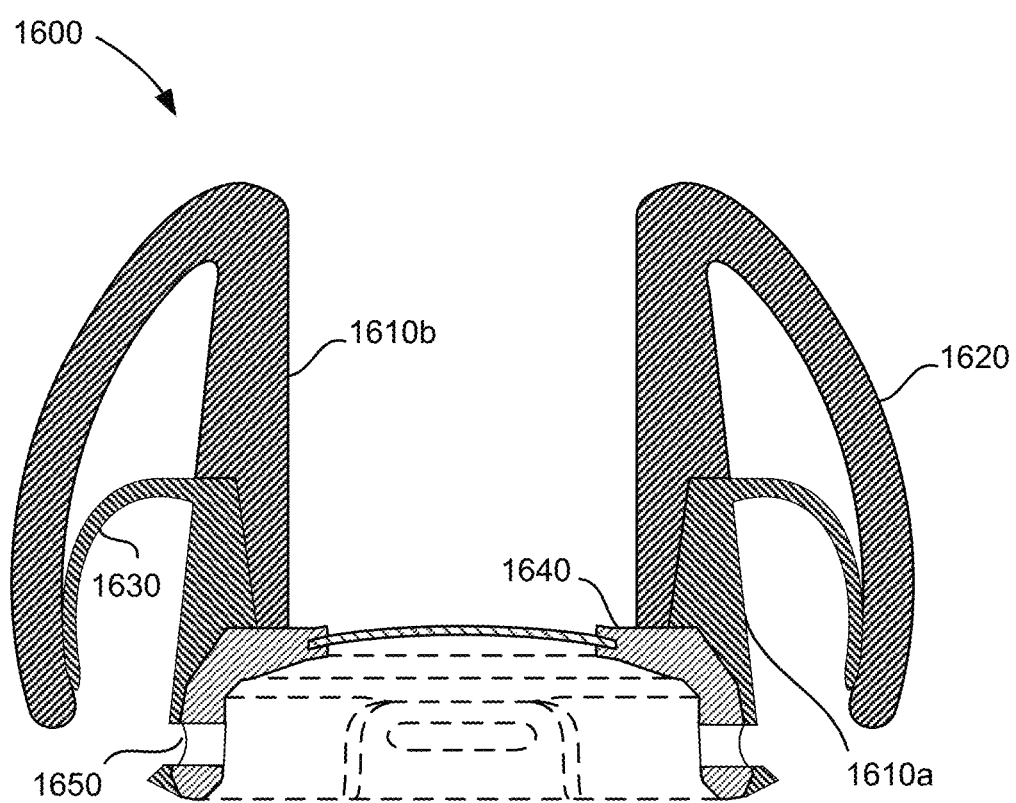
FIG. 16 is a simplified cross-sectional illustration of a double flange ear tip according to some embodiments.

FIG. 16 is a simplified cross-sectional view of a double flange ear tip 1600 according to some embodiments. Ear tip 1600 includes many of the same features as ear tip 1500 but outer ear tip body 1620 can be made from a material that has a different durometer than inner flange 1630. For example, ear tip 1600 can be formed with a double shot injection molding process in which a first injection molding step of the process forms both a portion 1610a of the inner ear tip body and all of inner flange 1630, and a second injection molding step of the process forms both a portion 1610b of the inner ear tip body and all of outer ear tip body 1620. Inner ear tip body portion 1610a flange and inner flange 1630 can be made from a higher durometer material to provide more structure to the ear tip, while inner ear tip body portion 1610b and outer ear tip body portion 1620 can be made from a lower durometer material that is more flexible to provide a better and more comfortable user fit.

As can be appreciated herein, the outer ear tip body of ear tips according to some embodiments can press against an inner surface of an ear canal to form an acoustic seal. This acoustic seal can enhance the quality of sound experience by the user, but it can also sometimes trap pressure in the ear canal, potentially causing an unpleasant sensation to the user. Thus, in some embodiments, ear tips can include one or more control leaks 1650 for preventing the trapping of pressure in the ear canal while still enabling the outer ear tip body to form an acoustic seal. Control leak 1650 creates a pathway from the sound channel created within the inner ear tip body to the ambient environment that can reduce pressure build-up within the ear canal. In some embodiments, one or more control leaks 1650 can be formed in a rigid attachment structure 1640 as shown in FIG. 16, but in other embodiments one or more control leaks can be formed through the inner ear tip body.

Charging Case

Some embodiments described herein pertain to a charging case that can store and charge a portable electronic device, such as a wireless listening device or a pair of portable wireless listening devices, such as a pair of earphones 300. The charging case can protect the portable electronic device or wireless listening devices from physical damage as well as provide a source of power for charging the electronic device or pair of wireless listening devices.

Figure 17A:
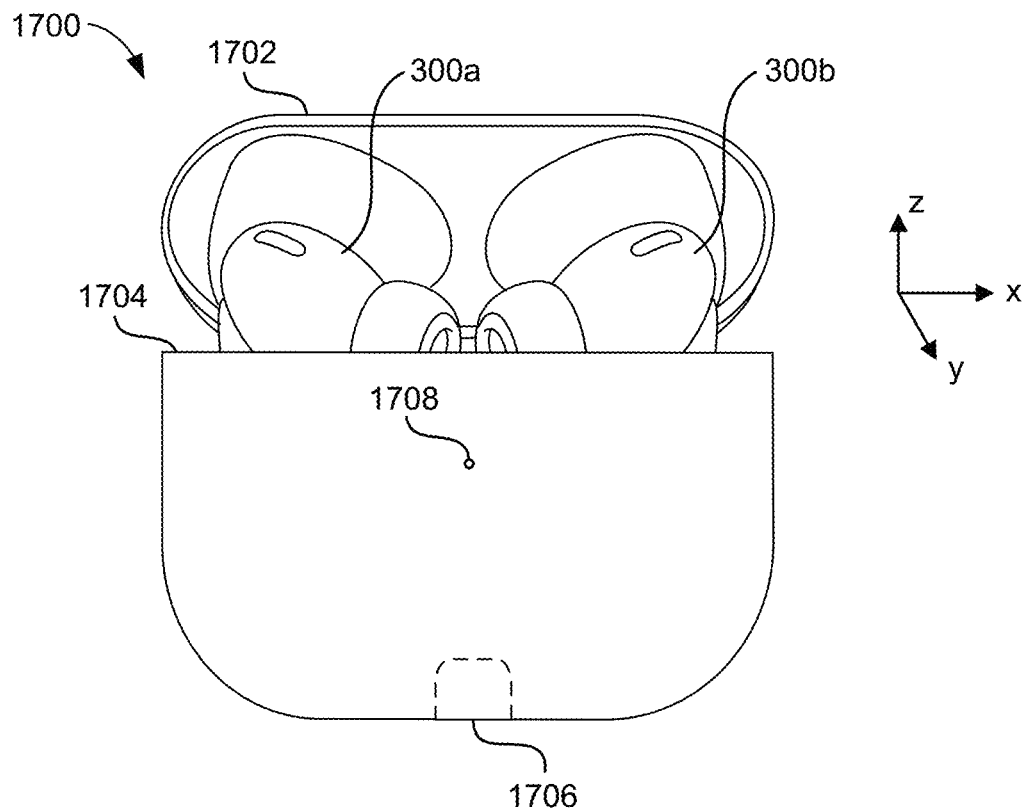
FIG. 17A is a simplified illustration of an earphone charging case according to some embodiments in which a lid of the charging case is open.
Figure 17B:
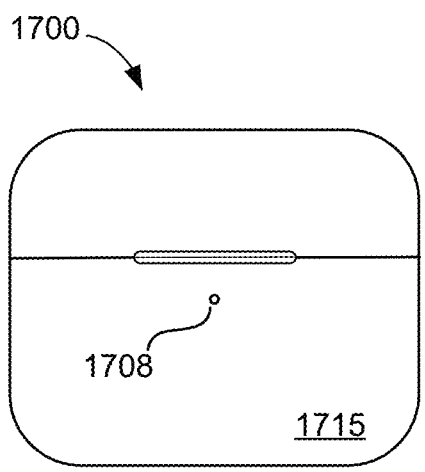
FIGS. 17B and 17C are simplified front view and rear view illustrations, respectively, of the earphone charging case shown in FIG. 17A with the lid of the charging case closed.
Figure 17C:
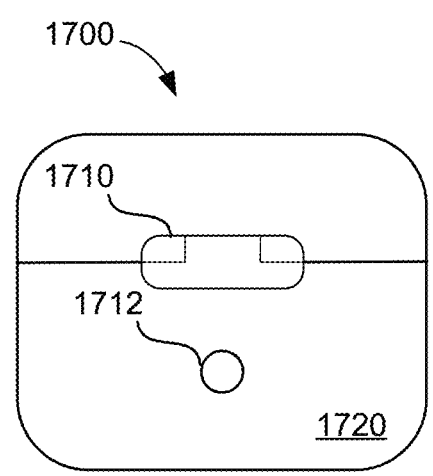

FIGS. 17A-17C are simplified plan views of a charging case 1700 that can store a pair of earbuds, such as earbuds 300, according to some embodiments of the present disclosure. As shown in each of FIGS. 17A-17C, case 1700 can include a lid 1702 and a body 1704 that forms an internal cavity for housing a pair of wireless listening devices 300a, 300b that can be worn in a user's left and right ears, respectively. FIGS. 17A and 17B are front plan views of charging case 1700 and FIG. 17C is a rear plan view of the charging case. Charging case 1700 is depicted in FIG. 17A with lid 1702 in an open position while FIGS. 17B and 17C depict the charging case with the lid in a closed position. Lid 1702 can be attached to body 1704 by a hinge 1710 (shown in FIG. 17C) that enables the lid to be moved between an open position (in which the earbuds 300a, 300b can be inserted into or removed from case 1700) and a closed position (in which the lid 1702 covers the earbuds 300a, 300b thereby completely enclosing the earbuds within the charging case 1700).

In some embodiments, charging case 1700 can include an internal frame (not visible in any of FIGS. 17A-17C) including portions designed to provide contours and surface features against which wireless listening devices 300a, 300b can rest in strategic positions discussed herein to minimize the size of case 1700.

To minimize the overall size of charging case 1700, earbuds 300a, 300b can be positioned at strategic angles when placed in case 1700. In some embodiments, each stem of the earbuds 300a, 300b is positioned at an angle with respect to two axis: an x-axis and a y-axis, instead of being positioned substantially vertically within the charging case. For purposes of description, the x-axis runs between earbuds 300a, 300b, the y-axis runs between the front and the back of charging case 1700, and the z-axis runs between the bottom of body 1704 and the top of lid 1702.

Case 1700 can be configured to charge wireless listening devices 300a, 300b when they are housed in case 1700. Towards this end, in some embodiments case 1700 can include two pairs of electrical contacts (not visible in FIGS. 17A-17C) for making electrical contact with respective contacts on the stems of each earbud so that charge can flow from an internal battery (not shown) of case 1700 to internal batteries of the earbuds 300a, 300b. The charging case internal battery can be charged by an external power supply that is electrically coupled to case 1700 via a connector 1706. Connector 1706 can be any appropriate physical connector interface, such as a lightning connector port developed by Apple, a USB-C port, a mini USB port or the like. In some embodiments charging case 1700 also includes a wireless power receiving coil (not shown) to wirelessly receive power that can be used to charge the internal battery as discussed in more detail below.

In some embodiments charging case 1700 is highly resistant to moisture ingression and can be designed to meet IPX4 water resistance standards. Towards this end, electrical components within case 1700 (e.g., the charging case battery, the circuit board on which the processor and other electronic circuitry that controls the operation of the charging case, etc.) can be sealed within an internal system volume that is sealed with external system seals. Additionally, each electrical component can be sealed individually with a conformal coating or adhesive. Some embodiments can further include a barometric vent within the connector 1706 module that is permeable to air but not liquids. The barometric vent allows charging case 1700 to be tested, in the manufacturing line, immediately after manufacture of the case is completed to determine if the charging case is fully sealed in accordance with the manufacturer expectations, for example, in accordance with the IPX4 requirements.

Case 1700 can also include a visual indicator 1708 configured to emit different colors of light. Visual indicator 1708 can change colors depending on the charge status of the case. As an example, indicator 1708 can emit green light when the case is charged, emit orange light when the charging case battery is charging and/or when the charging case battery has less than a full charge, and red light when the charging case battery is depleted. When viewed from outside of case 1700, visual indicator 1708 can have a circular shape, or any other suitable shape, such as square-like, rectangular, oval, and the like. Case 1700 can also include a user-interface 1712, such as a button, that when activated and when the earbuds are stored within case 1700 with lid 1702 open, initiates a pairing routine that allows the earbuds to be paired with a host device. While indicator 1708 and button 1712 are shown in FIGS. 17B and 17C on front and rear case surfaces 1715 and 1720, respectively, embodiments are not limited to any particular location for such user interfaces and these and other user interfaces can be positioned at any suitable exterior or interior surface of charging case 1700.

Charging case 1700 can be relatively small (e.g., less than 2½ inches long, less than 2 inches high and less than 1 inch deep), which enables a user to easily take the case wherever he or she goes. With charging case 1700 being so portable, it can also become misplaced. An earphone charging case according to some embodiments can include an audio driver module and controller circuitry that enables a host device to communicate with location-based finding feature, such as Find My Device developed by Apple, Inc.

Figure 18:
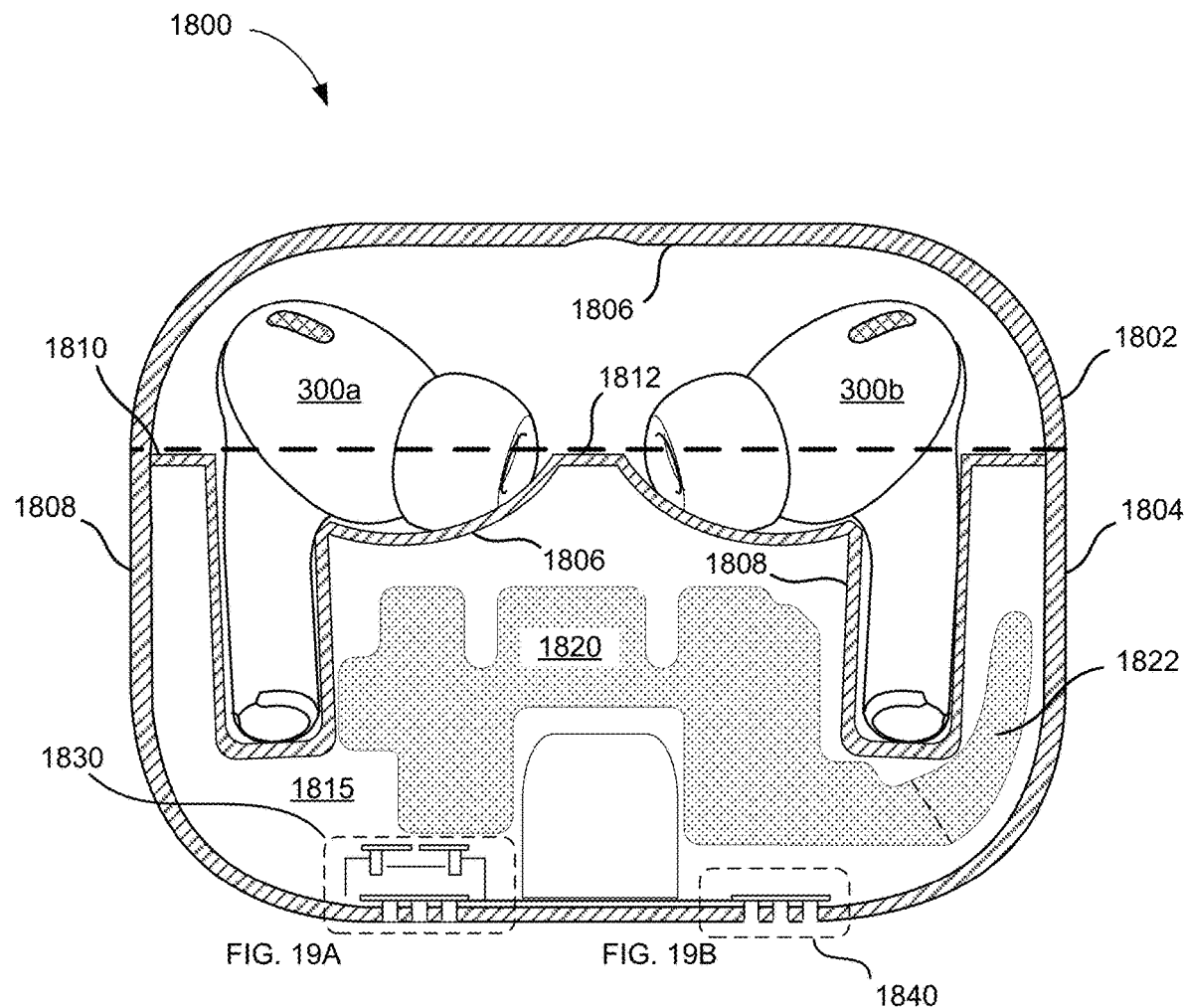
FIG. 18 is a simplified cross-sectional illustration of an earphone charging case according to some embodiments.

FIG. 18 is a simplified cross-sectional illustration of an earphone charging case 1800 according to some embodiments. Charging case 1800, which and can be representative of charging case 1700, includes a lid 1802 and a body 1804 that can be mechanically coupled to each other by a hinge (not shown). In some embodiments, each of lid 1802 and body 1804 can be hollow shells formed from a single continuous wall. For example, lid 1802 can a peripheral wall 1806 that defines both exterior and interior surfaces of the lid, while body 1804 can includes a peripheral wall 1808 that defines both exterior and interior surfaces of the body. A frame insert 1810 can fit within the peripheral wall 1808 and can include an insert wall 1812 that defines one or more cavities pockets for housing a pair of earphones, such as left and right earphones 300a and 300b or any of the earphones disclosed herein. As an example, in charging case 1800 frame insert 1810 can include a peripheral wall 1812 that defines contoured cavities 1806 and 1808 sized and shaped to accept a lower portion of earphones 300a, 300b.

Frame insert 1810 can cooperate with peripheral wall 1808 to form a waterproof, sealed chamber 1815 within body 1804 in which various internal components of the charging case can be positioned. For example, charging case 1800 can also include circuitry 1820, an antenna 1822 and a speaker module 1830 within the sealed chamber 1815. Circuitry 1820 and antenna 1822 can be formed on a common support substrate, such as a printed circuit board (PCB). Circuitry 1820 can include, among other devices, a wireless communication circuitry and a controller mounted on the PCB. Antenna 1822 can be formed within a corner of charging case 1800 and in some embodiments can be an ultra-wideband antenna. The circuitry 1820 and antenna can cooperate to wirelessly send out a secure signal (e.g., a Bluetooth signal) that can be detected by nearby devices in the Find My network. The nearby devices can then send the location of charging case 1800 to an iCloud or similar server via a wireless network (e.g., a cellular or WiFi network). The server can then make charging case 1800 visible to approved devices that can display the location of charging case 1800 on a map. The approved devices can also communicate with charging case 1800 via the various wireless networks to send a signal to circuitry 1820 that puts charging case 1800 in a lost mode and/or to play a sound through speaker module 1830 to help a user locate the charging case.

In some embodiments, speaker module 1830 can generate a relatively loud beeping sound noise to assist as part of the Find My Device routine (or similar location-based find technique) and charging case 1800 includes a B-vent module 1840 to help ensure that air pressure within the speaker module 1830 is equalized to the air pressure external to charging case 1800 in order for speaker module 1830 to function properly. Further details of speaker module 1830 and B-vent module 1840 are discussed below with respect to FIGS. 19A and 19B, respectively.

1. Speaker Module

Figure 19A:
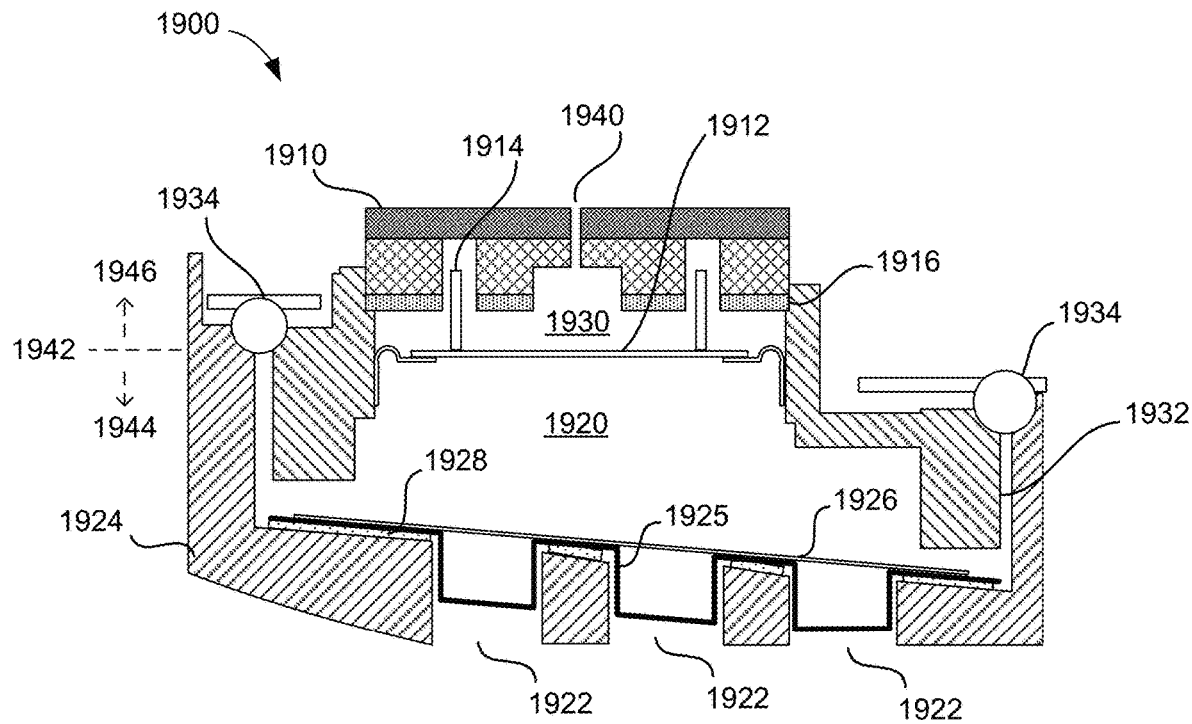
FIG. 19A is a simplified cross-sectional illustration of a speaker module disposed within an earphone charging case according to some embodiments.

FIG. 19A is a simplified cross-sectional illustration of a speaker module 1900 according to some embodiments that can be included in any of the earphone disclosed herein and can be representative of speaker module 1830. As shown in FIG. 19A, speaker module 1900 includes an audio driver 1910 that has a speaker membrane 1912, which is the dividing line between a front volume 1920 of audio driver 1910 and a back volume 1930 of the audio driver. Front volume 1920 is exposed to the outside air pressure through openings 1922 in a housing 1924 of the earphone in which speaker module 1900 is included. In some embodiments, openings 1922 can be, for example, three small circular holes formed through the housing 1924 but the openings are not limited to any particular shape or number. A cosmetic mesh 1925 and a water proof membrane 1926 can be attached (e.g., by a PSA layer 1928) across the openings 1922 to protect against debris and moisture ingress. As shown, cosmetic mesh 1925 can includes one or more small protrusions that extend from within housing 1924 into the openings 1922. In some embodiments the protrusions can be flush with an exterior surface of housing 1924 or slightly recessed within the openings 1922.

Front volume 1920 is sealed from back volume 1930 by various walls 1932 of speaker module 1900 and by seals 1934, which can be, for example, an o-ring or a similar sealing structure. Back volume 1930 extends into the sealed chamber 1815 of body 1804 through a speaker vent 1940, which can be covered with an acoustic membrane (not shown). Sealed chamber 1815 can be sealed with an airtight and waterproof seal to prevent moisture ingress into the body. Thus, back volume 1930 can be a completely enclosed and sealed space except for an opening to the outside environment through B-vent module 1940 as described below.

For speaker 1910 to provide a consistent volume and operation, the voice coil 1914, which is operatively coupled to the speaker member, should be centered within a magnetic pole piece 1916 of audio driver 1910. Such is the case when speaker membrane 1912 is in its nominal position 1942. If pressure inside of the charging case is greater than the outside world pressure, however, speaker membrane 1912 can be undesirably pushed outwards into region 1944 moving the voice coil 1914 outside its ideal position. Conversely, if pressure inside of the charging case is less than the outside world pressure, speaker membrane 1912 can be undesirably pulled inward into region 1946, which also moves the voice coil 1914 outside its ideal position. In some embodiments, charging case 1800 can include a B-vent module within the charging case that allows pressure to equalize between the front and back volumes 1920 and 1930, respectively.

2. B-Vent

Figure 19B:
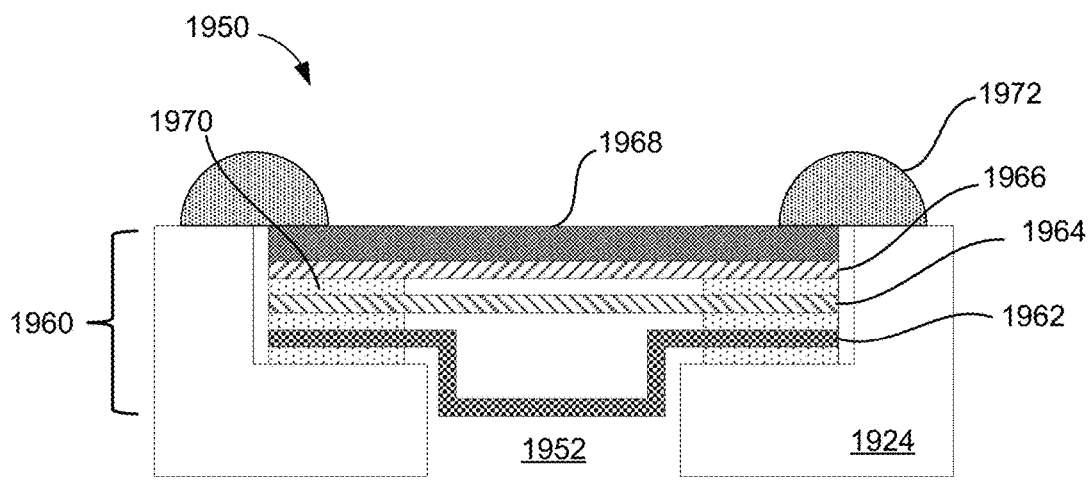
FIG. 19B is a simplified cross-sectional illustration of a B-vent disposed within an earphone charging case according to some embodiments.

FIG. 19B is a simplified cross-sectional illustration of a B-vent 1950 according to some embodiments that can be included in any of the earphones disclosed herein and can be representative of B-vent module 1840 shown in FIG. 18. B-vent 1950 can include one or more openings 1952 formed through the same housing 1924 in which openings 1922 are formed. In some embodiments, for cosmetic reasons, openings 1952, which can be on the right side of charging case 1800 can mirror openings 1922, which can be on the left side. Thus, as an example, if there are three small circular openings 1922, openings 1952 can also include three small circular openings having the same radius as openings 1922. For the B-vent to function properly, only a single opening is needed for the vent itself. Thus, while FIG. 18 shows three openings as part of the B-vent module 1840, only the center opening 1952 is depicted in FIG. 19B and the openings on the left and right of center opening 1952 can be sealed.

The B-vent opening 1952 provides an air path from speaker back volume 1930 through sealed chamber 1815 within body 1804 to the outside environment. A multi-layer mesh 1960 can cover opening 1952 preventing moisture and particles from entering the interior cavity of charging case 1800 while allowing air to cross the mesh. As shown in FIG. 19B, multi-layer mesh can include an outer cosmetic mesh 1962, which as an example, can be a stainless steel mesh and an acoustic mesh 1964. Similar to cosmetic mesh 1925, cosmetic mesh 1962 can includes one or more small protrusions that extend from within housing 1924 into the openings 1952. In some embodiments the protrusions can be flush with an exterior surface of housing 1924 or slightly recessed within the openings 1952.

The multi-layer mesh 1960 can also include a clad between multiple layers including a non-woven thermoplastic layer and a hydrophobic layer. In one particular embodiment, multi-layer mesh 1960 can include a clad between a non-woven polyethylene terephthalate (PET) mesh layer 1966 and a hydrophobic, waterproof layer 1968 formed from Polytetrafluoroethylene (PTFE). Mesh layers 1962, 1964 and the clad of layers 1966, 1968 can be stacked on top of each other and bonded together by PSA layers 1970 and the multi-layer mesh 1960 can be mechanically attached to housing 1924 or other structural components of earphone 1800 by a hot melt bond 1972 formed around the perimeter of the multi-layer mesh 1960.

Figure 20:
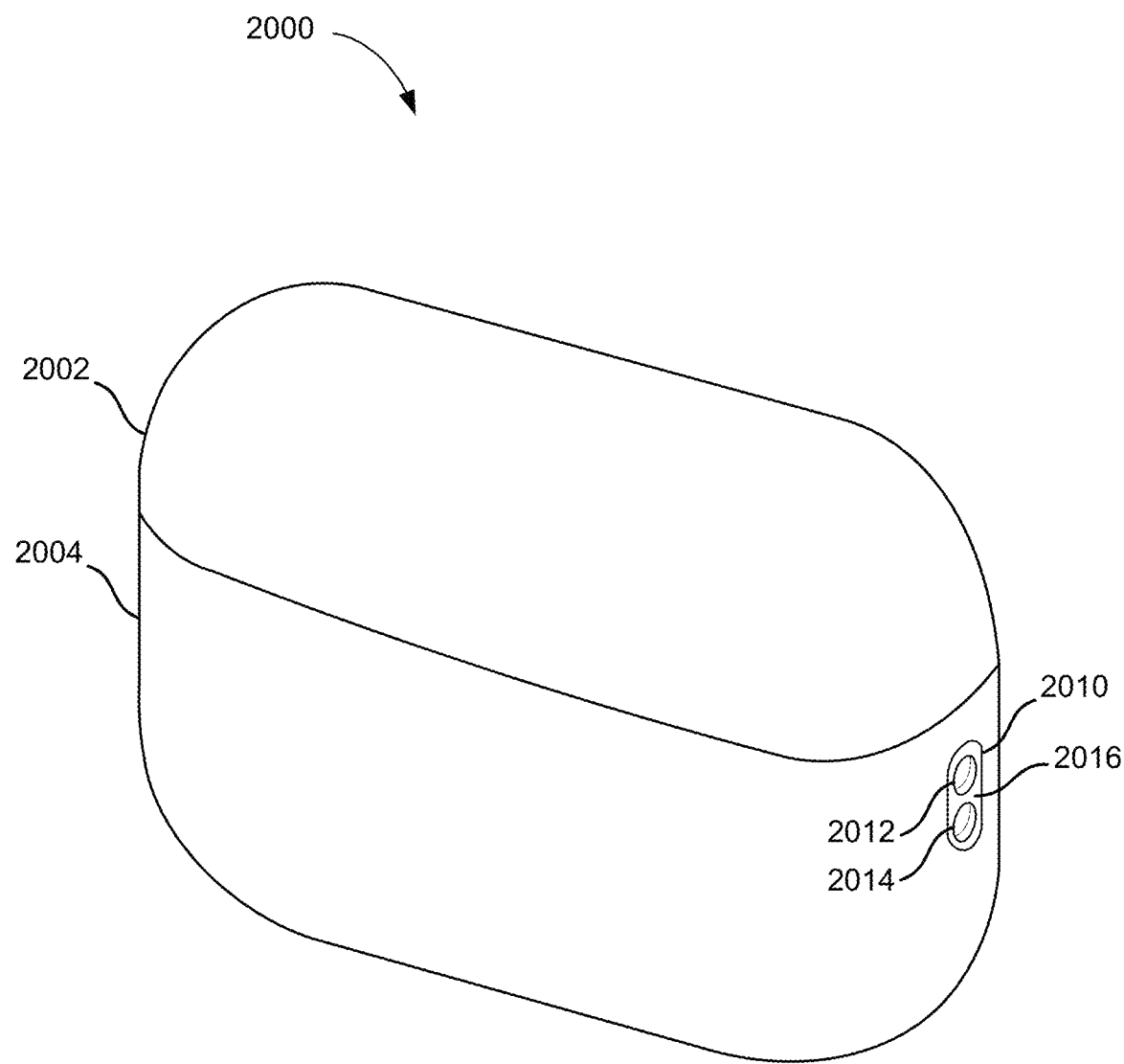
FIG. 20 is a simplified perspective view of a charging case that can store a pair of earbuds according to some embodiments.

FIG. 20 is a simplified perspective view of a charging case 2000 that can store a pair of earbuds, such as earbuds 300, according to some embodiments of the present disclosure. As shown charging case 2000 includes a lid 2002 and a body 2004 that can be mechanically coupled to each other by a hinge (not shown). The hinge allows lid 2002 to be moved between an open position (in which the earbuds 300a, 300b can be inserted into or removed from case 2000) and a closed position (in which the lid 2002 covers the earbuds 300a, 300b thereby completely enclosing the earbuds within the charging case 2000). In some embodiments, each of lid 2002 and body 2004 can be hollow shells formed from a single continuous wall.

Charging case 2000 can be representative of charging cases 1700 and 1800 and can include some or all of the same features as those charging cases. Additionally, charging case 2000 can include an eyelet 2010 that is mechanically attached body 2004. Eyelet 2010 can be made from metal, rigid plastic or another appropriate material and can include an outer surface that is generally flush with the outer surface of body 2004. Eyelet 2010 can also include first and second openings 2012, 2014 that connect to a common cavity (not labeled) behind a neck portion 2016 of the eyelet. The eyelet can serve as an attachment point for a lanyard (not shown) to be connected to charging case 2000 (e.g., by threading a small wire or strap of the lanyard behind neck portion 2016 through the openings 2012, 2014). The lanyard can then be wrapped around a user's wrist (or neck if the lanyard is sized sufficiently) so that a user can more easily carry charging case 2000 without worrying about losing the charging case.

Additional Embodiments

The foregoing description, for purposes of explanation, used specific nomenclature to provide a thorough understanding of the described embodiments. However, it will be apparent to one skilled in the art that the specific details are not required in order to practice the described embodiments. For example, while various examples of earphones described above were in the context of in-ear headphones that included deformable ear tips that can be inserted into a user's ear canal to form an airtight seal between the ear tip and the user's ear, various embodiments described herein are not limited to in-ear headphones. Thus, earphones according to some embodiments, can be configured to have an open, unsealed acoustic architecture that is sometimes referred to as a "leaky acoustic architecture" where the housing (e.g., speaker housing 310) can be sized and shaped to fit within a user's ear without having a deformable ear tip inserted into the ear canal. In such embodiments, all acoustic air volumes within the earbud have a free flowing air path to the ambient.

As another example, while embodiments of a multi-layer mesh that reduces the likelihood of occlusion events was described with respect to a rear vent, embodiments are not limited to any particular vent and a multi-layer mesh according to embodiments disclosed herein can be useful to protect the primary acoustic port, microphone openings and others. As still another example, while FIGS. 17A-19B discussed embodiments of an charging case that can store and charge a pair of wireless earphones, other embodiments can pertain to a charging case for wired earphones or other portable electronic devices.

Thus, the foregoing descriptions of the specific embodiments described herein are presented for purposes of illustration and description. They are not target to be exhaustive or to limit the embodiments to the precise forms disclosed. Also, while different embodiments of the invention were disclosed above, the specific details of particular embodiments may be combined in any suitable manner without departing from the spirit and scope of embodiments of the invention. Further, it will be apparent to one of ordinary skill in the art that many modifications and variations are possible in view of the above teachings.

Finally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A deformable ear tip comprising:
    an annular inner ear tip body having a sidewall extending between first and second opposing ends thereby defining a sound channel through the ear tip;
    an annular outer flange integrally formed with and surrounding the first end of the inner ear tip body and extending towards the inner ear tip second end forming an air gap between the annular inner ear tip body and the annular outer flange along a portion of a length of the ear tip, wherein the outer flange comprises a first material having a first durometer and is sized and shaped to be inserted into a human ear canal; and
    an inner flange integrally formed with the inner ear tip body and comprising a second material having a second durometer less than the first durometer, the inner flange body extending from a location along the inner ear tip body between the first and second ends towards an inner surface of the outer flange body.

2. The ear tip set forth in claim 1 wherein the outer flange has a first radius of curvature and the inner flange has a second radius of curvature greater than the first radius of curvature.

3. The ear tip set forth in claim 1 wherein the ear tip is formed with a double shot injection molding process in which one shot forms the outer flange and an upper portion of the inner ear tip body and a second shot forms the inner flange and a lower portion of the inner ear tip body.

4. The ear tip set forth in claim 1 wherein the inner flange extends fully around a perimeter of the inner ear tip body.

5. The ear tip set forth in claim 1 wherein the inner flange physically contacts the inner surface of the outer flange.

6. The ear tip set forth in claim 1 wherein the inner flange contacts the inner surface of the outer flange at a location where the outer flange curves inward towards the inner ear tip body.

7. The ear tip set forth in claim 1 wherein the sidewall of the inner ear tip body gradually varies in thickness from a first thickness at the first end to a second thickness at the second end.

8. The ear tip set forth in claim 7 wherein the second thickness is greater than the first thickness.

9. The ear tip set forth in claim 1 further comprising an annular rigid attachment structure coupled to the second end of the inner ear tip body, wherein the annular rigid attachment member includes an attachment member sidewall that defines a central opening that is aligned with and forms part of the sound channel.

10. The ear tip set forth in claim 9 wherein the attachment member sidewall includes at least one control leak formed there through creating an acoustic pathway between an ambient environment and the sound channel.

11. A deformable ear tip comprising:
    an annular inner ear tip body having a sidewall extending between first and second opposing ends thereby defining a sound channel through the ear tip;
    an annular outer flange integrally formed with and surrounding the first end of the inner ear tip body and extending towards the inner ear tip second end forming a gap between the annular inner ear tip body and the annular outer flange along a portion of a length of the ear tip; and
    an inner flange integrally formed with the inner ear tip body and comprising a second material having a second durometer less than the first durometer, the inner flange body extending from a location along the inner ear tip body between the first and second ends towards an inner surface of the outer flange body;

wherein the outer flange has a first radius of curvature and the inner flange has a second radius of curvature greater than the first radius of curvature.

12. The ear tip set forth in claim 11 wherein the ear tip is formed with a double shot injection molding process in which one shot forms the outer flange and an upper portion of the inner ear tip body and a second shot forms the inner flange and a lower portion of the inner ear tip body.

13. The ear tip set forth in claim 11 wherein the inner flange extends fully around a perimeter of the inner ear tip body.

14. The ear tip set forth in claim 11 wherein the inner flange physically contacts the inner surface of the outer flange.

15. The ear tip set forth in claim 11 wherein the inner flange contacts the inner surface of the outer flange at a location where the outer flange curves inward towards the inner ear tip body.

16. The ear tip set forth in claim 11 wherein the sidewall of the inner ear tip body gradually varies in thickness from a first thickness at the first end to a second thickness at the second end.

17. The ear tip set forth in claim 16 wherein the second thickness is greater than the first thickness.

18. The ear tip set forth in claim 11 further comprising an annular rigid attachment structure coupled to the second end of the inner ear tip body, wherein the annular rigid attachment member includes an attachment member sidewall that defines a central opening that is aligned with and forms part of the sound channel.

19. The ear tip set forth in claim 18 wherein the attachment member sidewall includes at least one control leak formed there through creating an acoustic pathway between an ambient environment and the sound channel.

20. A deformable ear tip comprising:

an annular inner ear tip body having a sidewall extending between first and second opposing ends thereby defining a sound channel through the ear tip;

an annular outer flange integrally formed with and surrounding the first end of the inner ear tip body and extending towards the inner ear tip second end forming an air gap between the annular inner ear tip body and the annular outer flange along a portion of a length of the ear tip, wherein the outer flange comprises a first material having a first durometer and is sized and shaped to be inserted into a human ear canal;

an inner flange integrally formed with the inner ear tip body and extending fully around a perimeter of the inner ear tip body from a location along the inner ear tip body between the first and second ends towards and physically contacting an inner surface of the outer flange body, the inner flange comprising a second material having a second durometer less than the first durometer; and an annular rigid attachment structure coupled to the second end of the inner ear tip body, wherein the annular rigid attachment member includes an attachment member sidewall that defines a central opening that is aligned with and forms part of the sound channel.

* * * * *